(12) United States Patent
Saito et al.

(10) Patent No.: US 6,440,351 B1
(45) Date of Patent: Aug. 27, 2002

(54) MOLDING DIE DRIVE UNIT, MOLDING UNIT AND MOLDING METHOD

(75) Inventors: Yoshiaki Saito; Tomokazu Abe, both of Ichihara; Shigeki Tamura, Yashio; Tsuneo Matsui, Sanjo, all of (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/446,670

(22) PCT Filed: Apr. 21, 1999

(86) PCT No.: PCT/JP99/02111

§ 371 (c)(1),
(2), (4) Date: Dec. 22, 1999

(87) PCT Pub. No.: WO99/55509

PCT Pub. Date: Nov. 4, 1999

(30) Foreign Application Priority Data

Apr. 24, 1998 (JP) .......................... 10-114973
Mar. 30, 1999 (JP) .......................... 11-089056

(51) Int. Cl.⁷ ............................................. B29C 45/56
(52) U.S. Cl. ............................ 264/328.7; 264/328.11; 425/555; 425/575; 425/589; 425/593
(58) Field of Search ................. 264/328.1, 328.11, 264/328.7; 425/589, 590, 595, 450.1, 451.2, 451.9, 555, 574, 575, 593, 451.6

(56) References Cited

U.S. PATENT DOCUMENTS 5,422,060 A * 6/1995 Nakamura ............... 264/328.1
5,660,783 A * 8/1997 Urbanek et al. ......... 264/328.1
6,103,174 A * 8/2000 Koda et al. .............. 264/328.1

FOREIGN PATENT DOCUMENTS

| JP | 55-79130 | 6/1980 |
|---|---|---|
| JP | 57-095429 | 6/1982 |
| JP | 60-122128 | 6/1985 |
| JP | 63-312125 | 12/1988 |
| JP | 7-125027 | 5/1995 |
| JP | 7-164500 | 6/1995 |
| JP | 7-214567 | 8/1995 |
| JP | 8-267212 | 10/1996 |
| JP | 9-38985 | 2/1997 |

* cited by examiner

Primary Examiner—Jill L. Heitbrink
(74) Attorney, Agent, or Firm—Flynn, Thiel, Boutell & Tanis, P.C.

(57) ABSTRACT

A molding die drive unit capable of both of compressing and expanding (volume enlargement) molten resin in molding die and having thin shape and superior mechanical efficiency, molding unit and molding process are provided. A molding die drive unit 20 for advancing and retracting a movable die 10B relative to a cavity 10C has a large-diameter main cylinder unit 21, and a plurality of small-diameter sub cylinder unit 22 disposed around the main cylinder unit 21. After loading the molten resin, the cylinder units 21 and 22 are driven to advance and retract the movable die 10B to the cavity 10C to compress or expand the molten resin in the cavity to conduct molding process.

19 Claims, 16 Drawing Sheets

F I G. 5 (A)
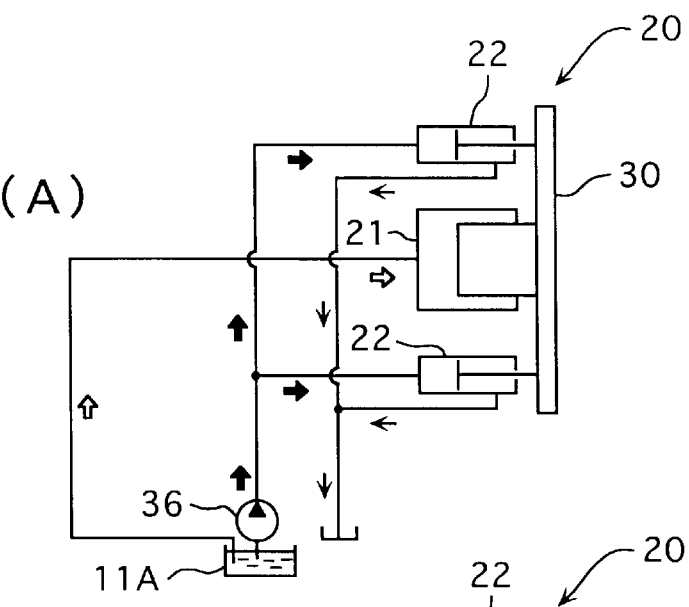
F I G. 5 (B)
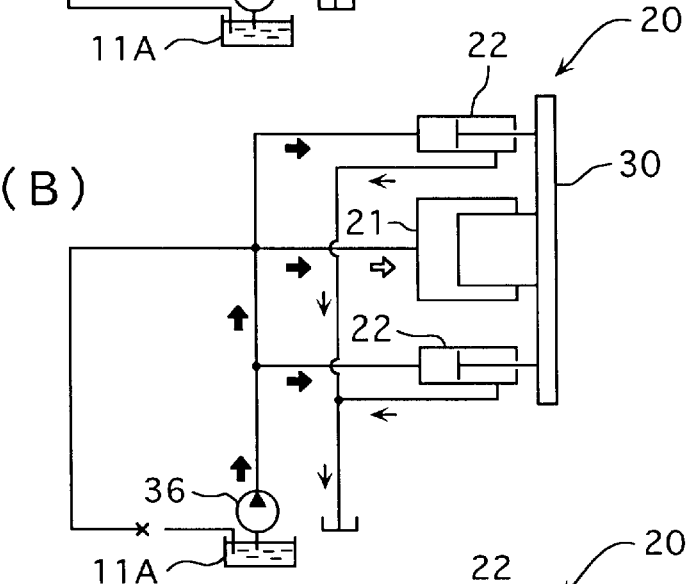
F I G. 5 (C)
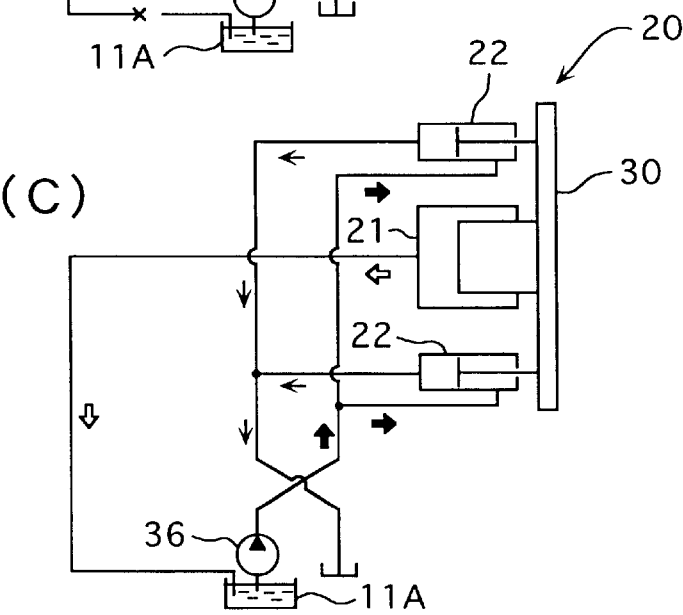

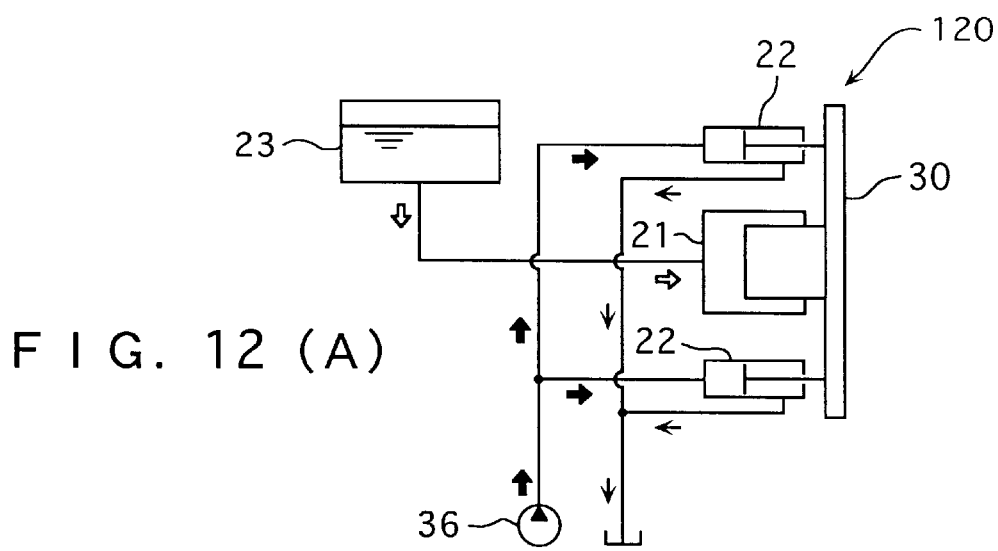
F I G. 12 (A)
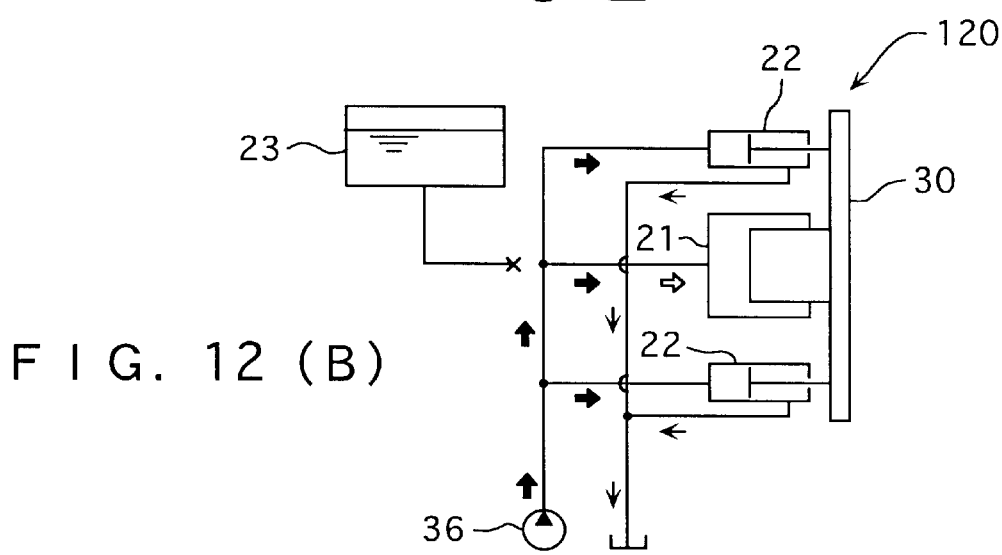
F I G. 12 (B)
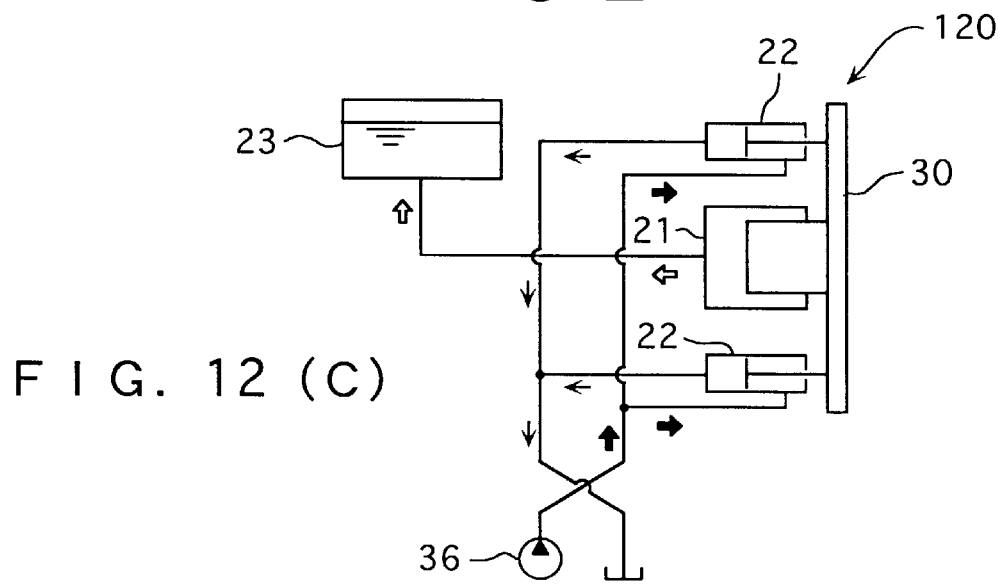
F I G. 12 (C)

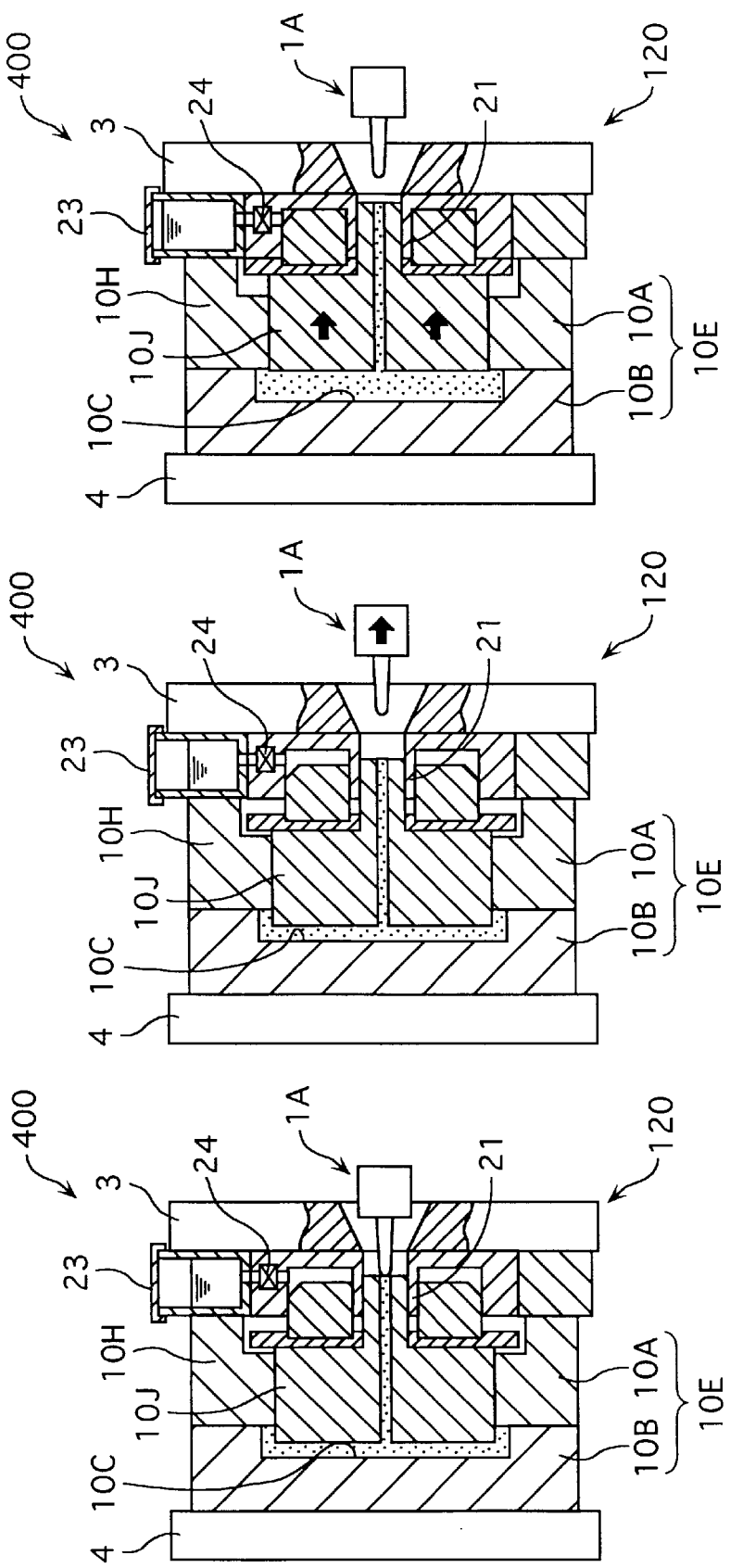

MOLDING DIE DRIVE UNIT, MOLDING UNIT AND MOLDING METHOD

TECHNICAL FIELD

The present invention relates to a molding die drive unit for advancing and retracting at least a part of a die to change a volume of a cavity provided in the die for compressing or expanding (enlarging volume) a resin in the die during injection molding, injection compression molding, press molding, large blow gas-injection molding, multi-layered molding, foam molding thereof, and expansion molding of glass-fiber containing resin; a molding unit incorporating the molding die drive unit; and a molding method using the molding unit.

BACKGROUND ART

In injection compression molding, molten resin is loaded inside a die closed with a predetermined compression margin retained and, subsequently, a compression force is applied to the molten resin filled in the die by clamping the die for rendering shape.

According to the injection compression molding, since the molding process can be conducted by a low resin injection pressure and in-mold pressure can be made uniform, warp and distortion are not caused to the molding product, thus being capable of obtaining molding products having good shape even with small thickness and causing less damage to a surface member during surface member integrating molding.

A molding machine used for the injection compression molding generally has a clamp unit for advancing a movable die provided to the molding machine movably toward a stationary die fixed to the molding machine, and a compression unit for compressing the molten resin filled inside the die.

As shown in Japanese Patent Publication Laid-Open No. Sho 57-95429 and Japanese Patent Publication Laid-Open No. Sho 60-122128, a conventional compression unit has a movable portion for increasing and decreasing a volume of a die cavity inside the die and a pin abutted to the movable portion through which the movable portion is advanced to reduce the volume of the cavity so that the molten resin filled inside the die is compressed.

For advancing the movable portion, a pair of slant member having mutually touching slant surfaces slanting relative to advancing direction of the movable portion is disposed along an advancing direction thereof and one of the slant members is moved in a direction orthogonal with the advancing direction of the movable portion to generate compression force.

Since injection compression molding is impossible for an ordinary die having no movable portion thereinside, such compression unit lacks general-purpose properties.

In order to solve the above problems, the Applicant of the present application has proposed a compression unit 75 having unitized mechanism for pressing a movable die 71 toward a stationary die 72 being capable of attaching and detaching between the movable die 71 and a clamp unit 74 (Japanese Patent Publication Laid-Open No. Hei 7-164500).

The compression unit 75 has a pair of slant member 77 and 78 disposed along the compressing direction both having a slant surface 76 slanting toward compressing direction. In the slant members, the slant member 78 on the clamp unit 74 side is advanced toward the slant member 77 by a cylinder unit 79 to generate compression force.

According to the compression unit 75, the entire thickness can be made relatively small as compared to the unit described in the Japanese Patent Publication Laid-Open No. Sho 57-95429 etc., which can be attached to an ordinary injection molding machine together with the die, thereby enabling injection compression molding even with an ordinary die having no movable portion installed therein so that general purpose properties of the molding machine can be improved.

However, since the above compression unit 75 converts drive force direction of the cylinder unit 79 by slidably moving the slant surfaces 76 of the relatively moving slant members 77 and 78, friction loss is increased, which result in low mechanical efficiency (50 to 70%) of the unit.

Further, in a molding method accompanying retraction of the movable die during molding process such as the foam molding which requires foaming of foaming agent by enlarging the volume of the cavity during injection or after injection, since the slide resistance of the slant members 77 and 78 is increased by the pressure of the resin injected into the die and since frictional force between the slant members 77 and 78 is static friction, large strength is required for initiating retraction of the slant member 78 for resisting against the static friction.

On the other hand, when the slant member starts moving, the frictional force between the slant members 77 and 78 changes from the static friction into dynamic friction and the slide resistance rapidly decreases.

Accordingly, moving speed is not stabilized and smooth relative movement of the slant members 77 and 78 is difficult, so that minute adjustment of the moving speed and position of the movable die are impossible, proving not suitable for molding method accompanying retraction of the movable die during molding process.

Further, since the pair of the slant members 77 and 78 are linearly disposed along the compressing direction, there is natural limit for reducing the thickness of the compressing unit.

An object of the present invention is to provide a molding die drive unit being capable of compressing and expanding the molten resin injected into the die and having reduced thickness and superior mechanical efficiency, a molding unit installed with the molding die drive unit and molding method using the molding unit.

DISCLOSURE OF THE INVENTION

The present invention is a unitized die driving unit detachably attached to any one of the stationary die and the movable die that intends to achieve the above object by providing a main cylinder used for pressurization and a plurality of sub cylinder unit used for pressurization and high-speed movement around the main cylinder unit.

More specifically, a molding die drive unit according to the present invention is for forming a cavity between a stationary die and a movable die for molten resin to be loaded, the molding die drive unit being detachably attached to either the stationary die or the movable die for moving a part of or entirety of at least one of the stationary die and the movable die to be advanced and retracted relative to the cavity. The molding die drive unit is characterized in having: a large-diameter main cylinder unit; and a plurality of small-diameter sub cylinder unit disposed around the main cylinder unit being spaced apart with each other.

In the present invention, the molding die drive unit advances and retracts a part of entirety of the stationary die or the movable die, or, a part of the stationary die or the movable die relative to the cavity. Advancement or retraction of the part of the stationary die or the movable die refers to advancement and retraction of a slide die when the dies are constructed of die body and the slide die disposed slidably relative to the die body.

According to the present invention, the molten resin is injected into the cavity after closing the stationary die and the movable die. After a predetermined time after initiating injection of the molten resin, the main cylinder unit and the sub cylinder unit are driven to advance and retract at least a part of the stationary die and the movable die relative to the cavity to compress or expand (volume enlargement) the molten resin in the cavity for rendering shape.

Small-diameter sub cylinder unit is used for advancing and retracting at least a part of the stationary die or the movable die to a predetermined position. In other words, hydraulic fluid (hydraulic pressure) is supplied from an external hydraulic source to the sub cylinder. At this time, by allowing circulation of the hydraulic fluid to the main cylinder unit, the main cylinder unit advances and retracts in accordance with advancement and retraction of the sub cylinder unit.

On the other hand, for pressurizing the molten resin in the cavity, not only the sub cylinder unit is advanced but also the large-diameter main cylinder unit is advanced by supplying hydraulic fluid (hydraulic pressure) thereto. At this time, since the circulation of the hydraulic fluid to the main cylinder is blocked, the hydraulic fluid (hydraulic pressure) to the main cylinder unit does not escape, thereby securely conducting advancement of the main cylinder unit.

Accordingly, in the present invention, the injection compression molding is possible by advancing at least a part of the stationary die or the movable die after initiating the injection of the molten resin into the cavity, and injection expansion molding and injection compression expansion molding is possible by advancing and retracting a part of the stationary die or the movable die.

Furthermore, since the large-diameter main cylinder unit is mainly used for pressurizing the molten resin, uniformity of strength applied to the entire molten resin can be secured, thereby securing parallelization between the movable die and the stationary die.

Further, since the large-diameter main cylinder unit is advanced only in pressurizing the molten resin and only the small-diameter sub cylinder unit is driven in retracting at least a part of the stationary die or the movable die, operation circuit for retracting the main cylinder unit is not necessary.

In other words, since the main cylinder unit becomes a single-drive cylinder only for advancement and retraction is conducted by the small-diameter sub cylinder unit, the cylinder units can be constructed of thin unit having large mechanical output, which can be attached to an ordinary injection molding machine together with the die.

In the above, the main cylinder unit may preferably be connected to a main cylinder driving mechanism, the main cylinder driving mechanism having: a main cylinder flow channel disposed between a hydraulic fluid feeder for feeding hydraulic fluid in a hydraulic tank and the main cylinder unit; and a main cylinder switching valve provided to the main cylinder flow channel for switching position thereof between a position for supplying the hydraulic fluid to the main cylinder unit to advance the main cylinder unit and a position for blocking supply of the hydraulic fluid to the main cylinder unit and for returning the hydraulic fluid in the main cylinder unit to the hydraulic tank.

According to the above arrangement, the circulation of the hydraulic fluid between the main cylinder unit and the hydraulic tank can be easily allowed and blocked by the main cylinder switching valve.

The molding die drive unit may further include a reserve tank disposed adjacent to the main cylinder unit and an on-off valve provided between the main cylinder unit and the reserve tank for allowing or blocking circulation of the hydraulic fluid between the main cylinder unit and the reserve tank.

In other words, the reserve tank may be intercommunicated with the main cylinder unit through the on-off valve.

According to the above arrangement, when the main cylinder unit advances and retracts in accordance with advancement and retraction of the sub cylinder unit, the exclusive reserve tank is used for supplying the main cylinder unit with hydraulic fluid and returning the hydraulic fluid from the main cylinder unit.

The reserve tank in communication with the main cylinder unit may be disposed adjacent to the main cylinder unit.

According to the above arrangement, the hydraulic fluid circulates smoothly between the reserve tank and the main cylinder unit when at least a part of the stationary die and the movable die advances and retracts at a high speed so that responsivity of the die movement can be improved and the size of the external hydraulic tank and the hydraulic pump can be reduced.

According to the present invention, the sub cylinder unit may be connected to a sub cylinder driving mechanism, the sub cylinder driving mechanism having: a sub cylinder flow channel provided between the hydraulic fluid feeder and the sub cylinder unit; a sub cylinder switching valve provided to the sub cylinder flow channel for switching a position thereof among a position for supplying the hydraulic fluid to the sub cylinder unit to advance the sub cylinder unit, a position for supplying the hydraulic fluid to the sub cylinder unit to retract the sub cylinder unit and a position for blocking intercommunication of the hydraulic fluid between the sub cylinder unit and the hydraulic fluid feeder.

According to the above arrangement, since the sub cylinder unit can easily be advanced and retracted by switching the sub cylinder switching valve, the molding process can be rapidly conducted.

Further, an opening may be formed along axis center of the main cylinder unit.

According to the above arrangement, the resin injection nozzle can be inserted from the opening, so that disposition on the stationary die side is possible. And when attached to the movable die side, the ejector rod can be inserted thereto, thereby facilitating ejection of molding products.

A molding unit according to the present invention has the above molding die drive unit between a movable platen having the movable die thereon and a stationary platen having the stationary die thereon or, alternatively, the molding die drive unit may be attached to the movable platen or the stationary platen. Further, a pressure-receiving block may be provided between the movable platen and the stationary platen.

According to the molding unit having the pressure-receiving block provided to the movable platen and the stationary platen, the pressure-receiving block provided to the stationary platen abuts to the pressure-receiving block provided to the movable platen in advancing the movable platen to receive high-pressure clamping force. The pressure-receiving blocks secure parallelization between the stationary die and the movable die attached to the platens, thereby conducting appropriate injection operation. Incidentally, the pressure-receiving block is important for increasing and decreasing the cavity volume by advancing and retracting the entire movable die.

A molding method for molding resin according to the present invention is a molding method using the above molding unit, which is characterized in having the steps of: injecting a molten resin to the cavity; and advancing and retracting a part or an entirety of at least one of the stationary die and the movable die relative to the cavity at any time period after initiation of injection.

In the above molding method, the sub cylinder unit may be driven to advance the part or the entirety of at least one of the stationary die or the movable die at a high speed relative to the cavity while intercommunicating the main cylinder unit with the hydraulic tank or the reserve tank, and, subsequently, hydraulic pressure may be applied to both of the main cylinder unit and the sub cylinder unit while blocking intercommunication of the main cylinder unit with the hydraulic tank or the reserve tank to pressurize the molten resin loaded in the cavity to advance the part or the entirety of at least one of the stationary die or the movable die relative to the cavity.

According to the above arrangement, injection compression molding can be appropriately conducted.

BRIEF DESCRIPTION OF DRAWINGS

FIG. 5(A) to FIG. 5(C) are summary views for showing molding method according to the first embodiment;

FIG. 12(A) to FIG. 12(C) are summary views for showing molding method according to the second embodiment;

FIG. 15 is a cross section showing primary portion of the injection molding unit of third embodiment indicating a condition immediately after loading the molten resin into a cavity;

FIG. 16 is a cross section showing primary portion of the injection molding unit of the third embodiment indicating a condition of expansion molding of the molten resin loaded in the cavity;

FIG. 18(A) to FIG. 18(C) are cross sections showing primary portions of injection molding unit according to another modification of the present invention.

BEST MODE FOR CARRYING OUT THE INVENTION

Figure 1:
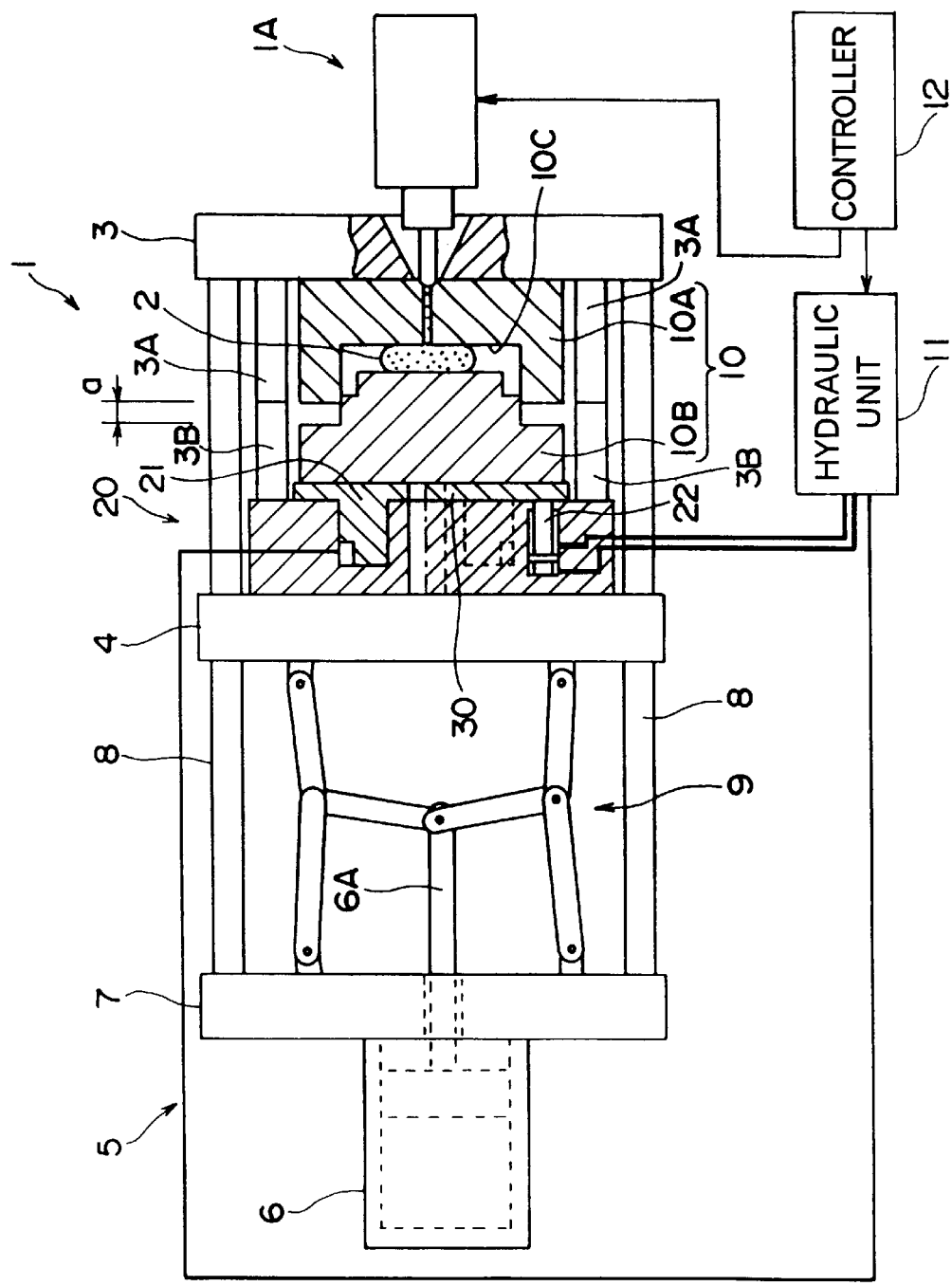
FIG. 1 is a side elevation showing entire arrangement of injection molding unit according to first embodiment of the present invention.

An embodiment of the present invention will be described below with reference to attached drawings. Incidentally, the same member as described thus far will be attached with the same reference numerals to omit or simplify description thereof.

FIG. 1 shows an injection molding unit 1 according to first embodiment of the present invention. The injection molding unit 1 conducts molding process by a die 10 divided into a stationary die 10A and a movable die 10B. The die 10 is closed while retaining moving distance of a dimension a as a compression margin of the movable die 10B relative to the stationary die 10A, so that a cavity 10C for loading a molten resin 2 injected from an injection unit 1A is formed therein. The loaded molten resin 2 is compressed to be filled for rendering shape by pressing the movable die 10B by a molding die drive unit 20 attached at the back of the movable die 10B.

The injection molding unit 1 has a stationary die plate 3 as a stationary platen having the stationary die 10A fixed thereto, a movable die plate 4 as a movable platen having the movable die 10B and the die driving unit 20, and a clamp unit 5 for advancing the movable die plate 4 toward the stationary die plate 3.

The movable die plate 4 is slidable along a tie-bar 8 spanning between a stationary plate 7 having a clamping hydraulic cylinder unit 6 fixed thereto and a stationary die plate 3.

The clamp unit 5 has a toggle mechanism 9 having a piston rod 6A of the hydraulic cylinder unit 6, where pressing force of the hydraulic cylinder unit 6 is strengthened by the toggle mechanism 9 to advance the movable die plate 4 to clamp the die 10.

Clamping-pressure receiving blocks 3A and 3B are provided between the movable die plate 4 and the stationary die plate 3. The clamping-pressure receiving block 3A provided on the stationary die plate 3 side abuts to the pressure-receiving block 3B provided on the movable die plate 4 side to receive high-pressure clamping force of the toggle mechanism 9. Degree of parallelization between the die plates 3 and 4 can be secured by the clamping-pressure receiving blocks 3A and 3B.

The molding die drive unit 20 has a large-diameter main cylinder unit 21 attached between the movable die 10B and the movable die plate 4, a small-diameter sub cylinder unit 22 disposed around the main cylinder unit 21, a hydraulic unit 11 for driving the cylinder units 21 and 22, and a controller 12 for controlling the die driving unit 20.

Figure 2:
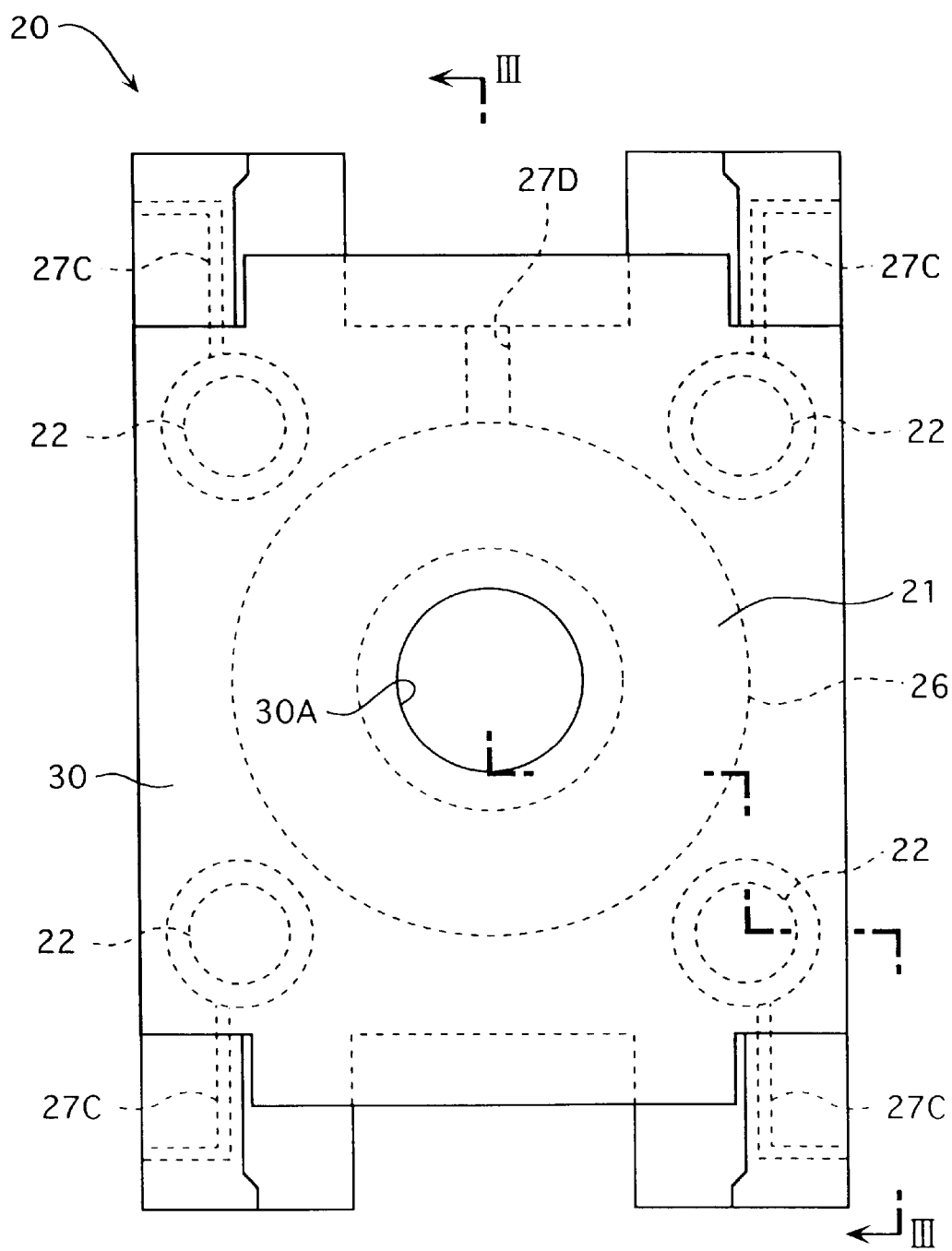
FIG. 2 is a front elevation showing a molding die drive unit according to the first embodiment.
Figure 3:
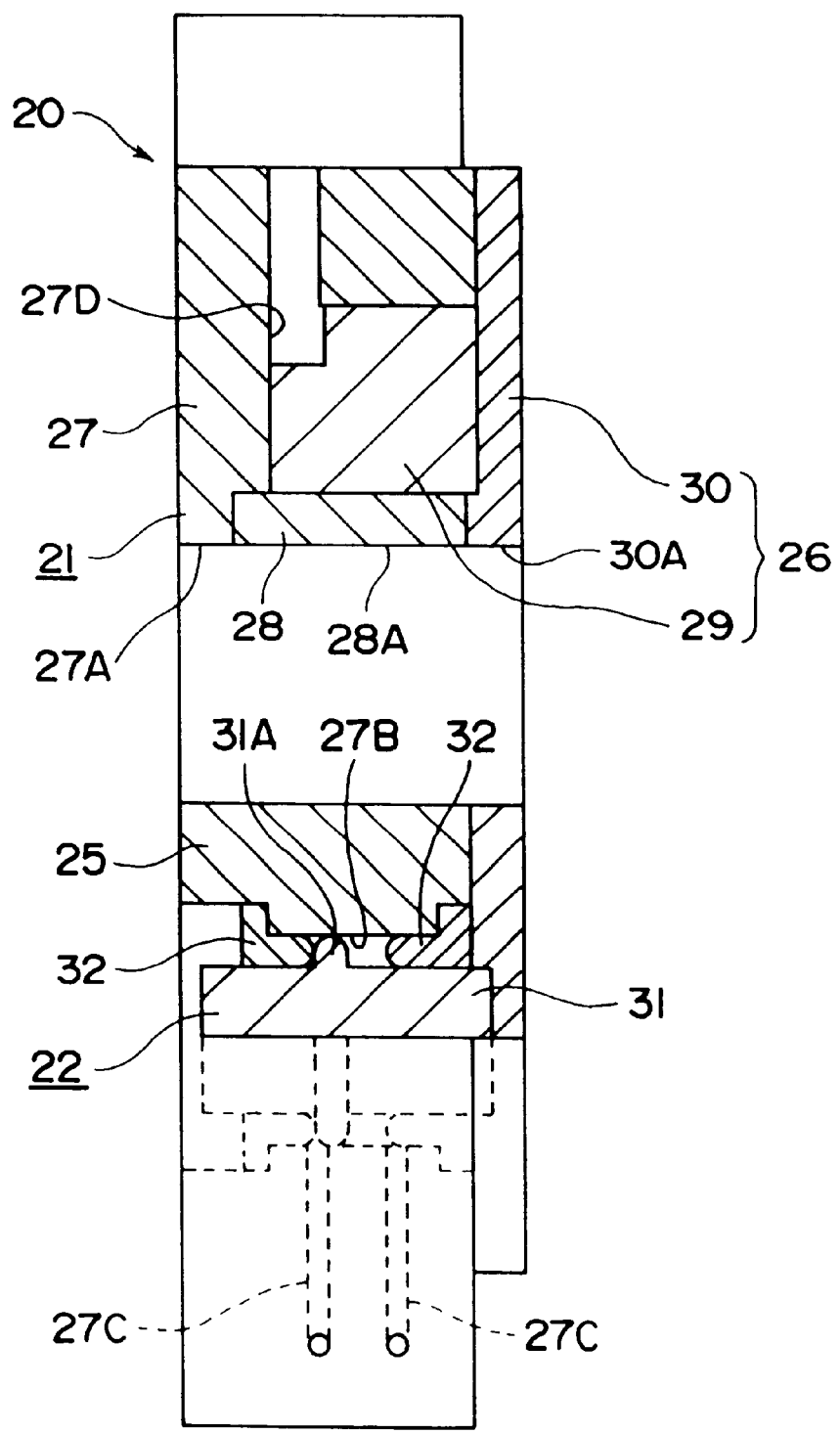
FIG. 3 is a cross section taken along III—III line in FIG. 2 viewed from arrow-indicated direction.
Figure 4:
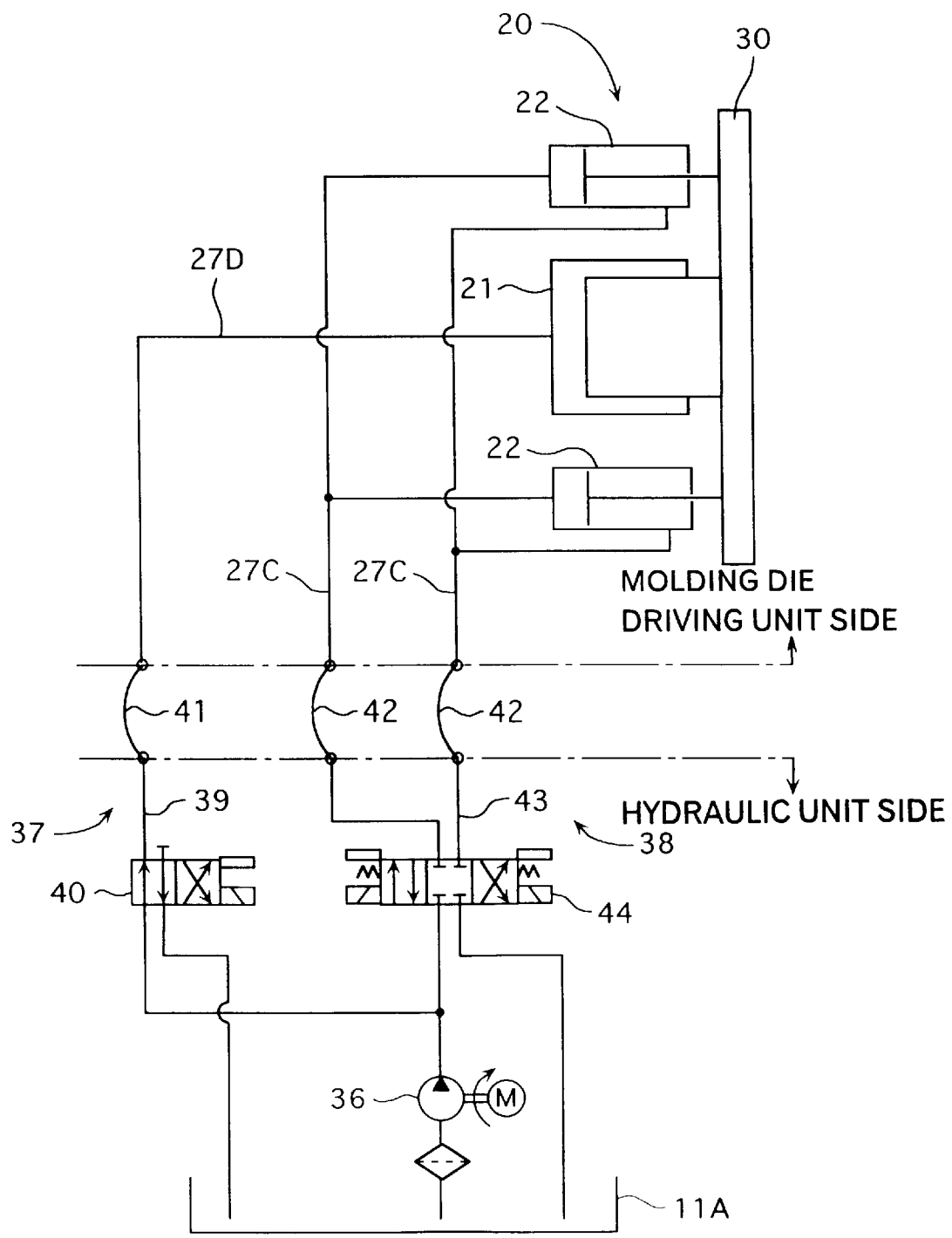
FIG. 4 is a summarized block diagram showing detailed arrangement of a hydraulic unit for driving the molding die drive unit.

Detailed arrangement of the molding die drive unit 20 is shown in FIG. 2 to FIG. 4.

FIG. 2 is a front elevation of the molding die drive unit 20, FIG. 3 is a cross section taken along III—III line in FIG. 2 viewed in arrow-indicating direction, and FIG. 4 is a summarized block diagram showing a hydraulic unit 11 for driving the molding die drive unit 20.

In FIGS. 2 and 3, the main cylinder unit 21 includes a cylinder member 25 and a piston member 26 advanceable and retractable relative to the cylinder member 25.

The cylinder member 25 has a thick flat-plate member 27 having a cylindrical cut-out 27A at a central portion thereof and a core member 28 provided at a central portion of the flat-plate member 27. An opening 28A is formed on the core member 28 along an axis center of the main cylinder unit 21 continuously with the cut-out 27A.

The piston member 26 includes a ring-shaped member 29 slidably disposed between the flat-plate member 27 and the core member 28, and an attachment plate 30 fixed at an end of the ring-shaped member 29 for the movable die 10B to be attached thereon. An opening 30A continuous with the opening 28A is formed at a position of the attachment plate 30 corresponding to an axis center of the ring-shaped member 29.

The sub cylinder unit 22 is disposed around the main cylinder unit 21 in plural (with number of n. Four in the figure) spaced apart with each other, which includes four cylinder portions 27B formed on the flat-plate member 27 and piston members 31 respectively disposed on the cylinder portion 27B to be slidable. The cylinder portion 27B is connected to the hydraulic unit 11 through a flow channel 27C formed on the flat-plate member 27. Incidentally, though disposition of the sub cylinder unit 22 is not restricted in the figure, the sub cylinder units 22 are preferably disposed at a regular interval as shown in the figure.

The piston member 31 has a projection 31A at a center thereof along a circumferential direction. The projection 31A is prevented from being fallen off by a pair of stopper 32 provided on the cylinder portion 27B. A flow channel 27C for supplying hydraulic fluid between the stoppers 32 and the projection 31A is formed on the flat plate member 27. The attachment plate 30 is fixed on an advancement-side end of the piston member 31.

The main cylinder 21 is advanced for pressurizing the molten resin loaded in the cavity 10C, and the sub cylinder unit 22 is used not only for pressurizing the molten resin, but also for moving the movable die 10B at a high speed.

When an effective sectional area of the main cylinder unit 21 is A, advancement-side effective sectional area of one sub cylinder unit 22 is B, and retraction-side effective sectional area thereof is C, cylinder effective sectional area of the movable die 10B during high-speed advancement is B*n, cylinder effective sectional area of the movable die 10B during high-speed retraction is C*n, and cylinder effective sectional area while pressurizing the molten resin is (A+B*n). The cylinder area ratio is A>>B (any one of B>C, B=C, and B<C), moving speed is high-speed advancement (retraction)>>pressurization, and moving force is pressurization>>high-speed advancement (retraction).

A conduit line 27D for intercommunicating the hydraulic unit 11 and a space between the cylinder member 25 and the piston member 26 is formed on the flat-plate member 27.

In FIG. 4, the hydraulic unit 11 includes a hydraulic tank 11A having the hydraulic fluid contained therein, a hydraulic pump 36 as a hydraulic fluid feeder for supplying the hydraulic fluid from the hydraulic tank 11A, a main cylinder driving mechanism 37 for driving the main cylinder unit 21 by the hydraulic fluid supplied from the hydraulic pump 36, and a sub cylinder driving mechanism 38 for driving the sub cylinder unit 22 by the hydraulic fluid supplied by the hydraulic pump 36.

The main cylinder driving mechanism 37 has a main cylinder flow channel 39 for circulating the hydraulic oil supplied from the hydraulic pump 36 to the main cylinder unit 21, and a main cylinder switching valve 40 provided to the main cylinder flow channel 39 for switching a position thereof between a position for supplying the hydraulic fluid from the hydraulic pump 36 to the main cylinder unit 21 to advance the main cylinder unit 21 and a position for blocking the supply of the hydraulic fluid to the main cylinder unit 21 and for returning the hydraulic fluid in the main cylinder unit 21 to the hydraulic tank 11A.

The main cylinder flow channel 39 is connected to a flow channel 27D provided to the molding die drive unit 20 through a hydraulic hose 41. The flow channel 27D is in communication with a space between the cylinder member 25 and the piston member 26 of the main cylinder unit 21. The main cylinder switching valve 40 is a solenoid valve.

The sub cylinder driving mechanism 38 includes a sub cylinder flow channel 43 provided between the hydraulic pump 36 and the sub cylinder unit 22, and a sub cylinder switching valve 44 provided to the flow channel 43.

The sub cylinder flow channel 43 is connected to the flow channel 27C provided to the molding die drive unit 20 through a hydraulic hose 42.

The sub cylinder switching valve 44 is capable of switching between three positions: a position for supplying the hydraulic fluid to the sub cylinder unit 22 to advance the sub cylinder unit 22; a position for supplying hydraulic fluid to the sub cylinder unit 22 to retract the sub cylinder unit 22; and a neutral position.

Next, molding method (molding process) will be described below with reference to FIG. 5 to FIG. 7.

First, the die 10 and the die driving unit 20 are attached to a general-type injection molding unit 1 together with clamping-pressure receiving blocks 3A and 3B to construct the injection compression molding unit as shown in FIG. 1. At this time, the piston members 26 and 31 of the molding die drive unit 20 are retracted.

When the injection molding unit 1 is driven, the clamp unit 5 is initially driven to move the movable die plate 4 to the stationary die plate 3 and the die 10 is closed while retaining a compression margin of a dimension a on the movable die 10B. At this time, the dimension a can be set within a range of, for instance, 0.1 mm to 100 mm.

At this time, since the clamping-pressure receiving blocks 3A and 3B are provided between the movable die plate 4 and the stationary die plate 3, the die plates 3 and 4 go parallel when the toggle mechanism 9 of the clamp unit 5 is fully extended and the parallelization of the die plates 3 and 4 are stably maintained. Consequently, the stationary die 10A and the movable die 10B are stabilized.

Subsequently, the molten resin is injected from an injection nozzle of the injection unit 1A to the internal cavity 10C of the die 10 so as not to fill the cavity.

The injected molten resin is thermoplastic, which may be general-purpose resin such as polyethylene, polypropylene, polystyrene, ABS, engineering plastics such as polycarbonate, polyamide, polyacetal, and compounds of the above resins with reinforcing agent such as glass fiber, carbon fiber and organic fiber, bulking agent such as talc and various additives, including all polymeric material capable of using for injection molding.

After a predetermined time passes from initiating injection of the injection unit 1A or when an injection screw provided in the injection unit 1A reaches a predetermined position, the molding die drive unit 20 is driven. The drive of the molding die drive unit 20 may be conducted after injecting the resin or during injection, and the resin injection amount to the cavity 10C of the die 10 can be voluntarily set.

Since the internal molten resin is not filled in the entire cavity and large force is not required for moving the movable die 10B when the drive of the molding die drive unit 20 is started, driving speed takes precedence over driving force. In other words, the four sub cylinder units 22 are advanced to advance the movable die 10B at a high speed.

Accordingly, the main cylinder flow channel 39 is intercommunicated with the hydraulic tank 11A by the main cylinder switching valve 40 and the position of the sub cylinder switching valve 44 is switched to supply the hydraulic fluid to the sub cylinder unit 22 to advance the sub cylinder unit 22.

Then, as shown in FIG. 5(A), the hydraulic fluid is fed from the hydraulic pump 36 to the sub cylinder unit 22, so that the attachment plate 30 having the movable die 10B attached thereon is advanced at a high speed by the sub cylinder unit 22. Though an advancing force is generated to the piston member 26 of the main cylinder unit 21 in accordance with the advancement of the attachment plate 30, since the hydraulic fluid contained in the hydraulic tank 11A is flown into the main cylinder unit 21 through the conduit line 27D by switching the switching valve 40, the piston member 26 is advanced smoothly.

When the movable die 10B advances at a degree, the molten resin loaded in the cavity 10C of the die 10 is pressurized.

For the purpose, the main cylinder switching valve 40 is operated to switch the position thereof to intercommunicate the main cylinder flow channel 39 with the hydraulic pump 36.

Figure 6:
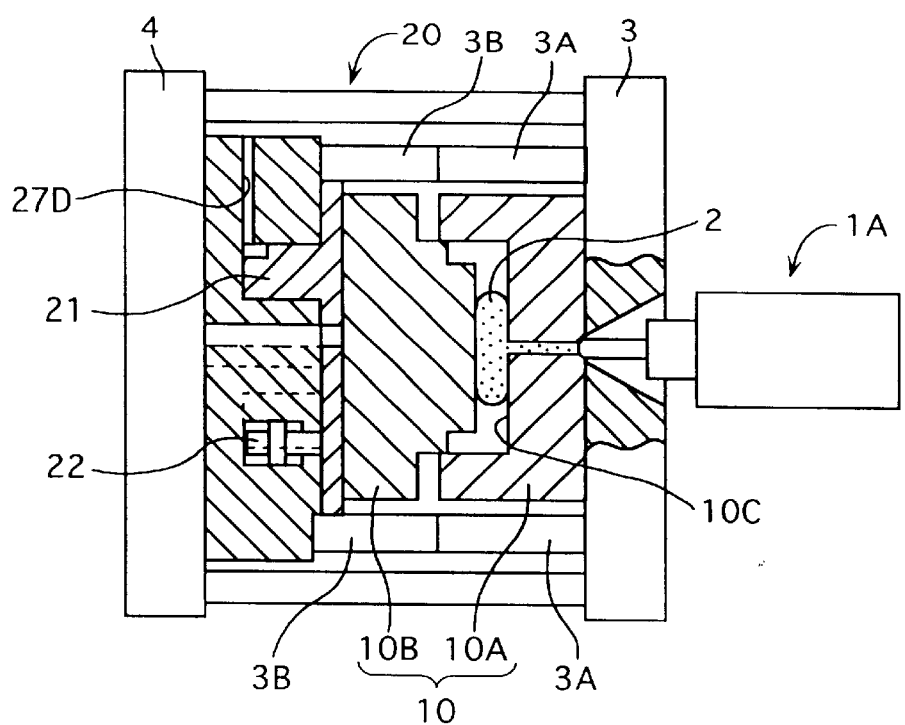
FIG. 6 is a cross section showing primary portion of the injection molding unit indicating a condition immediately after loading the molten resin into a cavity.
Figure 7:
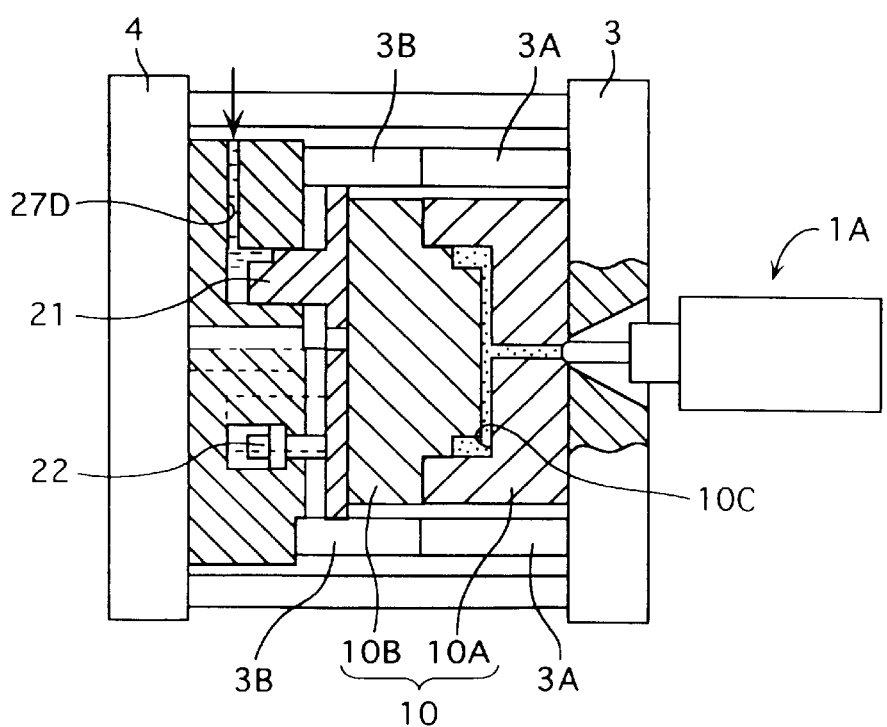
FIG. 7 is a cross section showing primary portion of the injection molding unit indicating a condition when the molten resin loaded in the cavity is pressurized.

Then, as shown in FIG. 5(B), the hydraulic fluid is fed from the hydraulic pump 36 not only to the sub cylinder unit 22 but also to the main cylinder unit 21, so that large force by the cylinder units 21 and 22 works on the movable die 10B to fill the entirety of the cavity 10C, with molten resin loaded to the cavity 10C between the movable die 10B and the stationary die 10A as shown in FIG. 7 from a condition being concentrated to a central portion of the cavity shown in FIG. 6.

While applying pressure to the molten resin by the molding die drive unit 20, the molten resin is cooled and solidified for a predetermined time period. When the molten resin is sufficiently solidifies after the predetermined time, the clamp unit 5 is driven to retract the movable die plate 4 to open the die 10. Subsequently, the molding product is ejected from the inside of the die 10 to complete the molding process. Thereafter, the injection compression molding process is repeated as necessary.

The cylinder units 21 and 22 are retracted during a time period from initiation of retracting the movable die plate 4 to initiation of next injection molding process.

For the purpose, the position of the main cylinder switching valve 40 is switched to intercommunicate the main cylinder flow channel 39 with the hydraulic tank 11A, and the position of the sub cylinder switching valve 44 is switched to supply the hydraulic fluid to the sub cylinder unit 22 to retract the sub cylinder unit 22.

Then, as shown in FIG. 5(C), the hydraulic fluid is fed from the hydraulic pump 36 to the sub cylinder unit 22 to retract the attachment plate 30 having the movable die 10B attached thereon at a high speed by the sub cylinder unit 22. In accordance with the retraction of the attachment plate 30, a force for retracting the piston member 26 of the main cylinder unit 212 is caused. However, since the hydraulic fluid contained in the main cylinder unit 21 by the switching valve 40 is returned to the inside of the hydraulic tank 11A through the conduit line 27D, the piston member 26 is retracted smoothly.

According to the above-described first embodiment, following effects can be obtained.

1) Since the molding die drive unit 20 includes the main cylinder unit 21 and the sub cylinder unit 22 for advancing and retracting the movable die 10B to the cavity 10C, injection compression molding is possible by advancing the movable die after injecting the molten resin into the cavity 10C.

2) Since the large-diameter main cylinder unit 21 is mainly used for pressurizing the molten resin, uniformity of the force applied to the entirety of the molten resin can be secured and parallelization between the movable die 10B and the stationary die 10A can be secured.

3) Since the main cylinder unit 21 is advanced only for pressurizing the molten resin and only the sub cylinder unit 22 is driven for retracting the movable die 10B, the operation circuit for retracting the main cylinder unit 21 is unnecessary. In other words, since the main cylinder unit 21 is a single-drive cylinder for advancement and the retraction is conducted by the sub cylinder unit 22, the cylinder units 21 and 22 can be made to be a thin unit having large mechanical output, which can be attached to an ordinary injection molding unit together with the die 10.

4) Since the sub cylinder units 22 can be disposed mutually at an equal interval around a center of the main cylinder unit 21, the movable die 10B can be appropriately advanced and retracted without being inclined.

5) Since, in the first embodiment, the sub cylinder unit 22 is connected to the sub cylinder driving mechanism 38, which includes the sub cylinder flow channel 43 provided between the hydraulic pump 36 and the sub cylinder unit 22 and the sub cylinder switching valve 44 provided to the flow channel 43 for switching the position thereof for supplying the hydraulic fluid to the sub cylinder unit 22 to advance the sub cylinder unit 22 and for supplying the hydraulic fluid to the sub cylinder unit 22 to retract the sub cylinder unit 212, the sub cylinder unit 22 can be easily advanced and retracted only by switching the sub cylinder switching valve 44, thereby rapidly conducting molding process.

6) Since the main cylinder unit 21 is connected to the main cylinder driving mechanism 37, which includes the main cylinder flow channel 39 for supplying the hydraulic fluid supplied from the hydraulic pump 36 to the main cylinder unit 21 and the main cylinder switching valve 40 provided to the main cylinder flow channel 39 for switching intercommunication of the main cylinder unit 21 and the hydraulic pump 36 or the hydraulic tank 11A, the main cylinder unit 21 can be easily advanced by operating the switching valve 40, thereby rapidly conducting molding process.

7) In the first embodiment, since the openings 28A and 30A are formed along the axis center of the main cylinder unit 21, an ejector rod (not shown) can be inserted from the openings 28A and 30A, thereby facilitating ejection of the molding product.

8) Since the injection molding unit 1 of the first embodiment has a molding die driving device 20 attached between the movable platen 4 for the movable die 10B to be mounted and the movable die 10B and the clamping-pressure receiving blocks 3A and 3B provided between the movable platen 4 and the stationary platen 3, the parallelization between the stationary platen 3 and the movable platen 4, in the end, the parallelization between the stationary die 10A and the movable die 10B attached to the platens 3 and 4 can be secured, thereby enabling appropriate injection compression molding.

Next, second embodiment according to the present invention will be described below with reference to FIG. 8 to FIG. 14.

The second embodiment differs from the first embodiment in having a reserve tank in addition to the hydraulic tank 11A and a on-off valve provided adjacent to the reserve tank, and the other arrangement is the same as the first embodiment. In the following description of the second embodiment, the same reference numerals will be applied to the components identical with or similar to the first embodiment to omit or simplify the description therefor.

Figure 8:
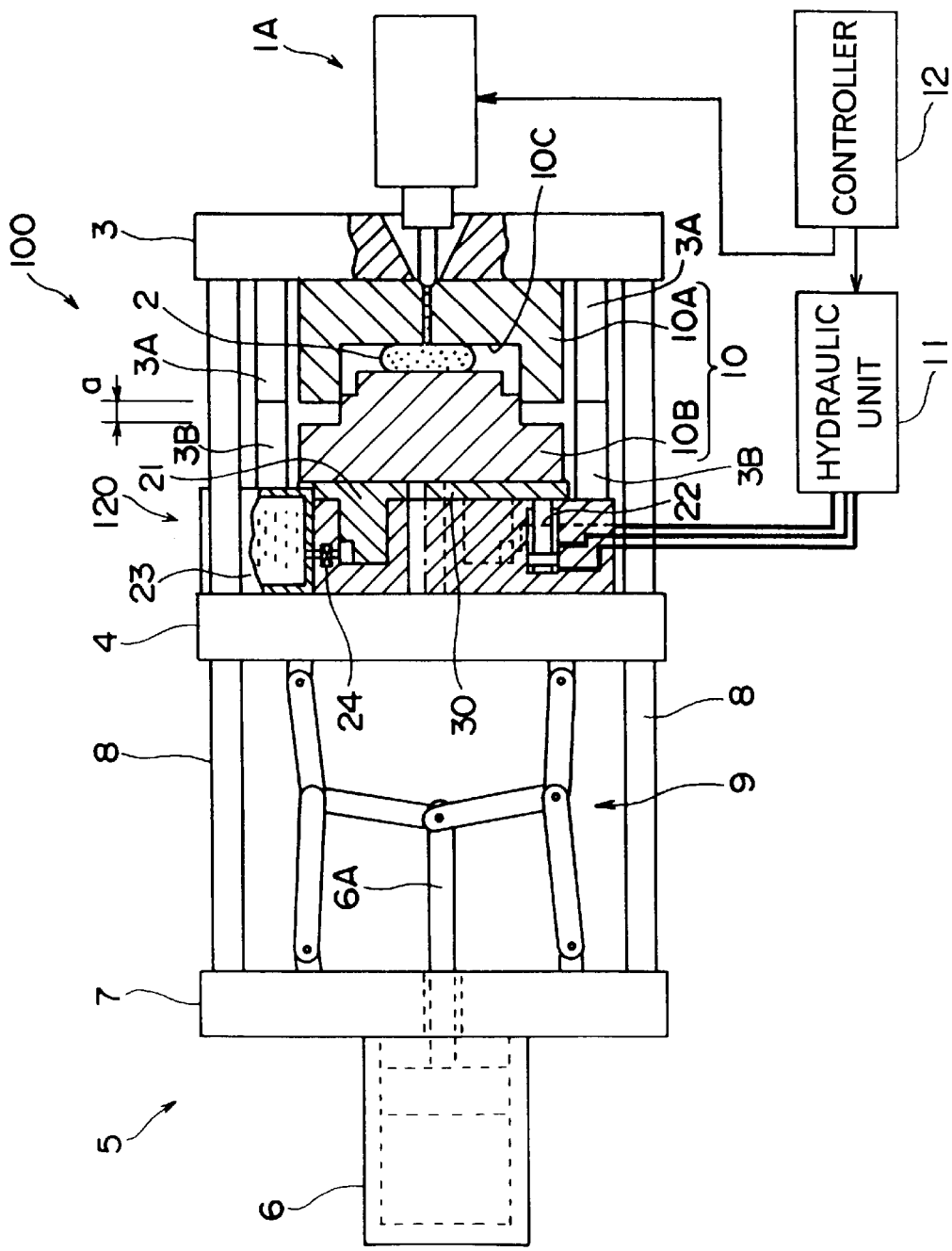
FIG. 8 is a side elevation showing entire arrangement of the injection molding unit according to second embodiment of the preset embodiment.

FIG. 8 shows an injection molding unit 100 according to the second embodiment.

As in the first embodiment, the injection molding unit 100 includes the die 10, the stationary die plate 3, the movable die plate 4 and the clamp unit 5, and further includes a molding die drive unit 120.

The molding die drive unit 120 has the main cylinder unit 21, the sub cylinder unit 22, a reserve tank 23 in communication with the main cylinder unit 21, an on-off valve 24 for allowing or blocking a circulation of the hydraulic fluid between the reserve tank 23 and the main cylinder unit 21, the hydraulic unit 11 for driving the cylinder units 21 and 22, and the controller 12 for controlling the die driving unit 20.

Figure 9:
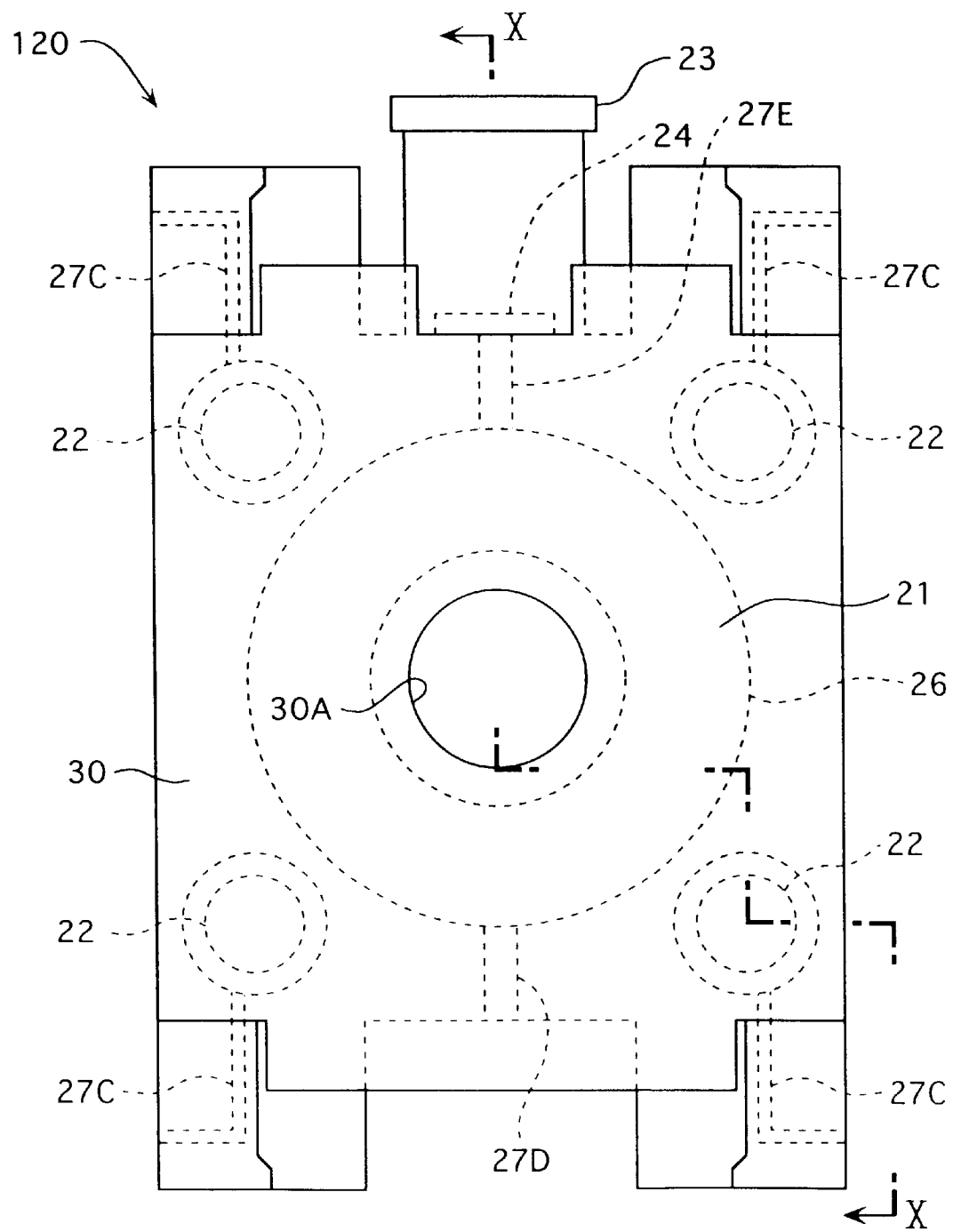
FIG. 9 is a front elevation of molding die drive unit according to the second embodiment.
Figure 10:
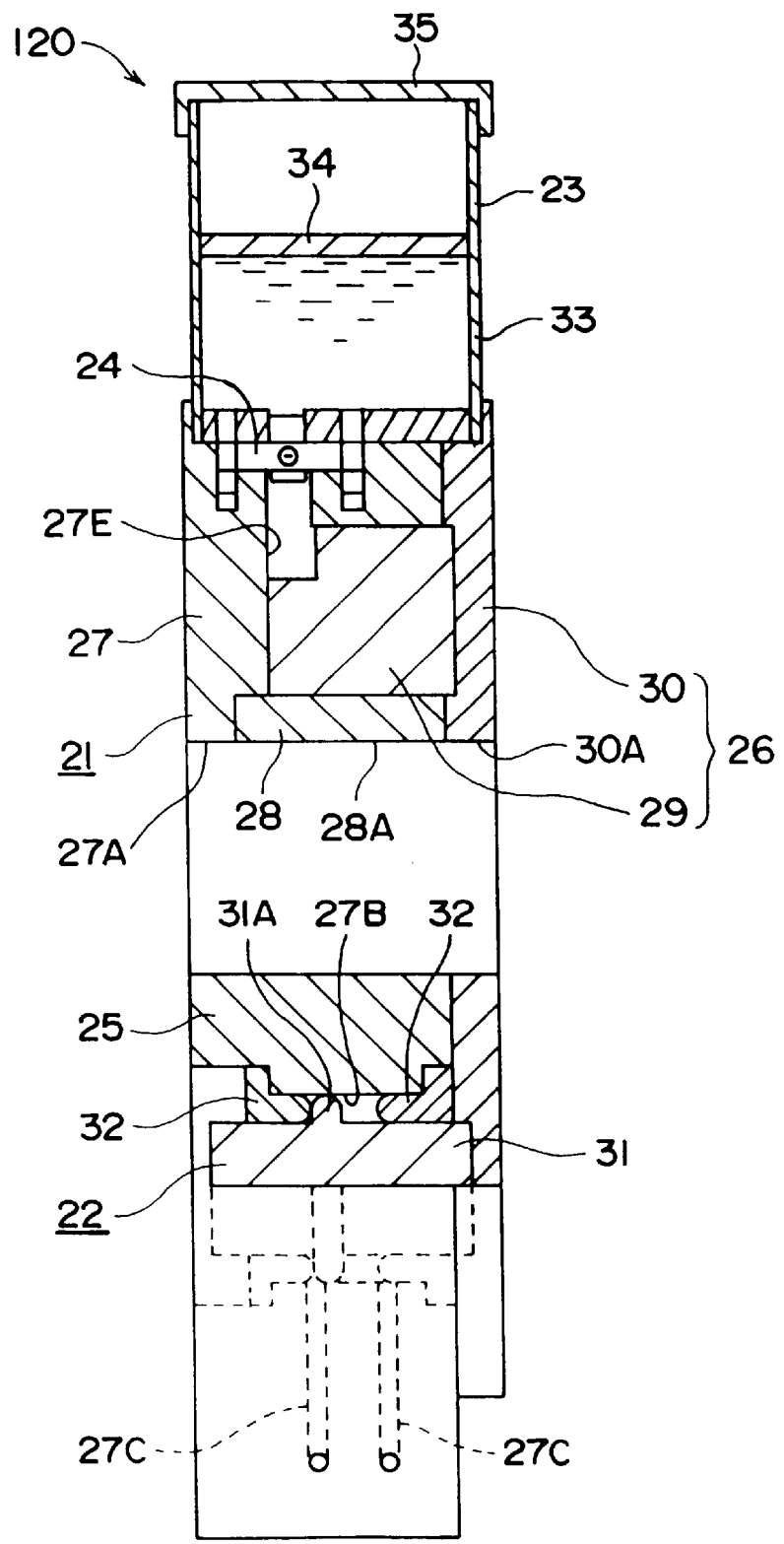
FIG. 10 is a cross section taken along X—X line in FIG. 9 viewed from arrow-indicated direction.
Figure 11:
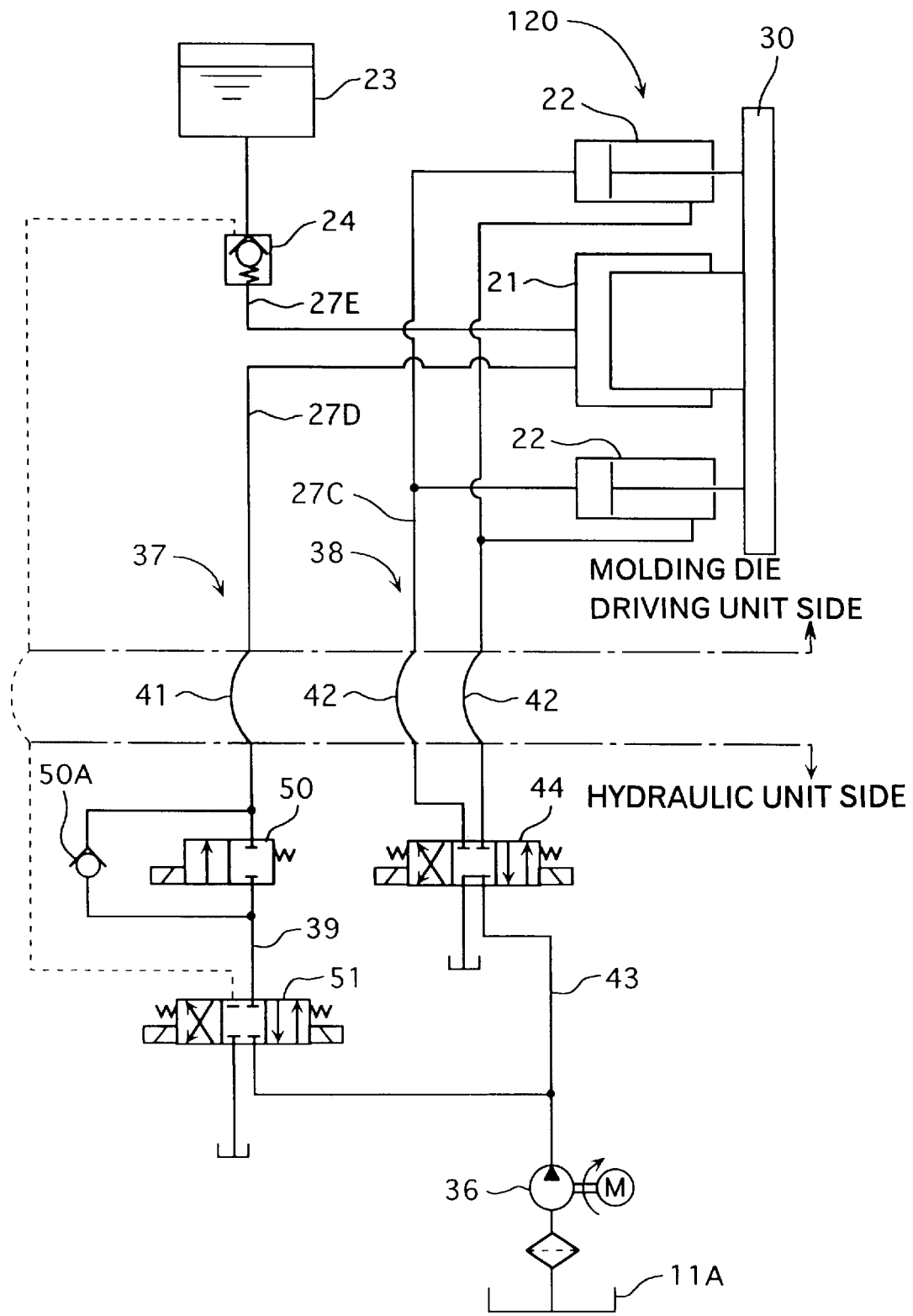
FIG. 11 is a summarized block diagram showing detailed arrangement of a hydraulic unit for driving the molding die drive unit.

Detailed arrangement of the molding die drive unit 120 is shown in FIG. 9 to FIG. 11.

FIG. 9 is a front elevation of the molding die drive unit 120, FIG. 10 is a cross section taken along X—X line in FIG. 9 viewed in arrow-indicating direction, and FIG. 11 is a summarized block diagram showing a hydraulic unit 11 for driving the molding die drive unit 120.

In FIGS. 9 and 10, the main cylinder unit 21 and the sub cylinder unit 22 have the same basic structure as the main cylinder unit 21 and the sub cylinder unit 22 of the first embodiment.

More specifically, the main cylinder unit 21 includes a cylinder member 25 and a piston member 26, and the cylinder member 25 has a thick flat-plate member 27 having a cylindrical cut-out 27A at a central portion thereof and a core member 28 provided at the center of the flat-plate member 27. An opening 28A is formed on the core member 28 along an axis center of the main cylinder unit 21 continuously with the cut-out 27A. The piston member 26 includes a ring-shaped member 29 slidably disposed between the flat-plate member 27 and the core member 28, and an attachment plate 30 fixed at an end of the ring-shaped member 29 for the movable die 10B to be attached thereon. An opening 30A continuous with the opening 28A is formed at a position of the attachment plate 30 corresponding to an axis center of the ring-shaped member 29.

The sub cylinder unit 22 is disposed around the main cylinder unit 21 in plural (with number of n. Four in the figure) spaced apart with each other, which includes four cylinder portion 27B formed on the flat-plate member 27 and a piston member 31 disposed on the cylinder portion 27B to be slidable respectively. The cylinder portion 27B is connected to the hydraulic unit 11 through a flow channel 27C formed on the flat-plate member 27. Incidentally, though disposition of the sub cylinder unit 22 is not restricted in the figure, the sub cylinder units 22 are preferably disposed at a regular interval as shown in the figure.

The piston member 31 has a projection 31A at a center thereof along a circumferential direction. The projection 31A is prevented from being fallen off by a pair of stopper 32 provided on the cylinder portion 27B. A flow channel 27C for supplying hydraulic fluid between the stoppers 32 and the projection 31A is formed on the flat plate member 27. The attachment plate 30 is fixed on an advancing-side end of the piston member 31.

When an effective sectional area of the main cylinder unit 21 is A, advancement side effective sectional area of one sub cylinder unit 22 is B, and retraction side effective sectional area thereof is C, cylinder effective sectional area of the movable die 10B during high-speed advancement is B*n, cylinder effective sectional area of the movable die 10B during high-speed retraction is C*n, and cylinder effective sectional area while pressurizing the molten resin is (A+B*n). The cylinder area ratio is A>>B (any one of B>C, B=C, and B<C), moving speed is high-speed advancement (retraction)>>pressurization, and moving force is pressurization>>high-speed advancement (retraction).

The reserve tank 23 is disposed adjacently to the main cylinder unit 21, the reserve tank 23 including a bottomed cylindrical casing 33 directly fixed on an upper surface of the flat-plate member 27 containing the hydraulic fluid thereinside, an oil-level pressing piston member 34 disposed in the casing 33 ascending and descending in accordance with oil level of the hydraulic fluid and a lid member 35 attached to an upper end surface of the casing 33.

A conduit line 27E for intercommunicating the internal space of the reserve tank 23 containing the hydraulic fluid and a space of the cylinder member 25 and the piston member 26 is formed on the flat-plate member 27, the conduit line 27E having the on-off valve 24. The on-off valve 24 is a prefill valve to be opened in receiving a pilot hydraulic pressure and closed in the other occasion.

In FIG. 11, the hydraulic unit 11 includes a hydraulic tank 11A, a hydraulic pump 36 for supplying hydraulic fluid contained in the hydraulic tank 11A, a main cylinder driving mechanism 37 for driving the main cylinder unit 21 by the hydraulic fluid supplied from the hydraulic pump 36, and a sub cylinder driving mechanism 38 for driving the sub cylinder unit 22 by the hydraulic fluid supplied by the hydraulic pump 36.

The main cylinder driving mechanism 37 has a main cylinder flow channel 39 for circulating the hydraulic oil supplied from the hydraulic pump 36 to the main cylinder unit 21, and a main cylinder on-off valve 50 for blocking or allowing the circulation of the hydraulic fluid in the main cylinder flow channel 39 and a main cylinder control valve 51 for controllably opening and shutting the on-off valve 24 of the reserve tank 23 and for blocking or allowing the circulation of the hydraulic oil in the main cylinder flow channel 39.

The main cylinder flow channel 39 is connected to a flow channel 27D provided to the molding die drive unit 120 through a hydraulic hose 41. The main cylinder switching valve 40 is a solenoid valve having a check-valve 50A.

The main cylinder control valve 51 is a solenoid valve capable of switching three positions: a position for feeding pilot hydraulic pressure to the on-off valve 24 and for blocking the circulation of the hydraulic fluid in the main cylinder flow channel 39; a position for allowing the circulation of the hydraulic oil in the main cylinder flow channel 39 without feeding the pilot hydraulic pressure; and a neutral position.

The sub cylinder driving mechanism 38 includes a sub cylinder flow channel 43 provided between the hydraulic pump 36 and the sub cylinder unit 22, and a sub cylinder switching valve 44 provided to the flow channel 43.

The sub cylinder flow channel 43 is connected to the flow channel 27C provided to the molding die drive unit 120 through a hydraulic hose 42.

The sub cylinder switching valve 44 is capable of switching between three positions: a position for supplying the hydraulic fluid to the sub cylinder unit 22 to advance the sub cylinder unit 22; a position for supplying hydraulic fluid to the sub cylinder unit 22 to retract the sub cylinder unit 22; and a neutral position.

Figure 13:
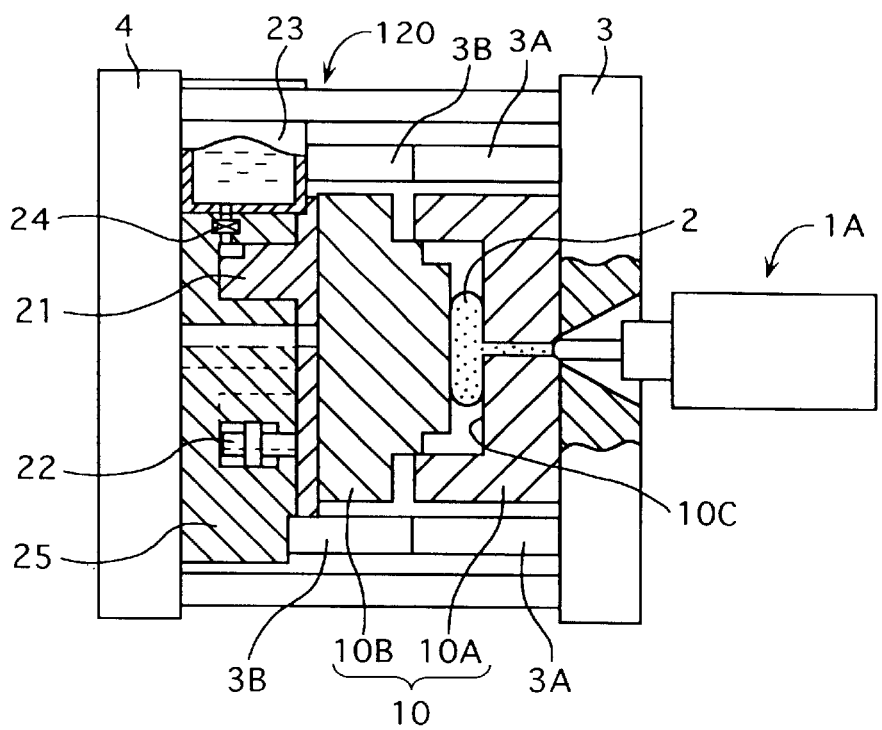
FIG. 13 is a cross section showing primary portion of the injection molding unit of the second embodiment indicating a condition immediately after loading the molten resin into a cavity.
Figure 14:
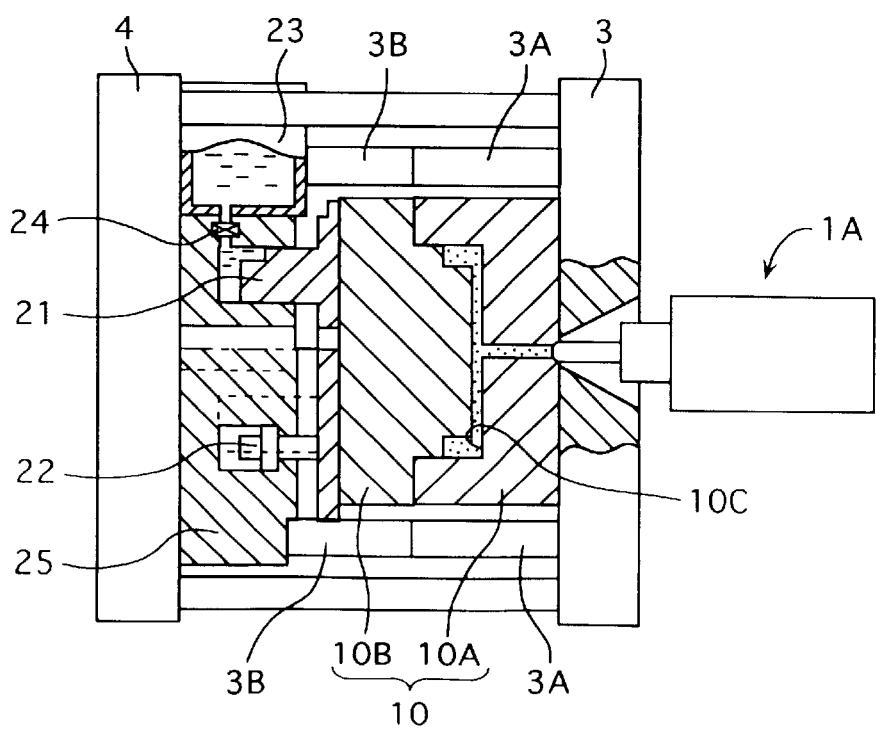
FIG. 14 is a cross section showing primary portion of the injection molding unit of the second embodiment indicating a condition when the molten resin loaded in the cavity is pressurized.

Next, molding method (molding process) will be described with reference to FIG. 12 to FIG. 14. Basic molding process of the second embodiment is the same as the first embodiment.

First, as shown in FIG. 8, the die 10 and the die driving unit 20 are attached to a general-type injection molding unit 100 together with clamping-pressure receiving blocks 3A and 3B. At this time, the piston members 26 and 31 of the molding die drive unit 120 are retracted.

When the injection molding unit 100 is driven, the clamp unit 5 is initially driven to move the movable die plate 4 to the stationary die plate 3 and the die 10 is closed while retaining a compression margin of a dimension a on the movable die 10B. At this time, the dimension a can be set within a range of, for instance, 0.1 mm to 100 mm.

At this time, since the clamping-pressure receiving blocks 3A and 3B are provided between the movable die plate 4 and the stationary die plate 3, the die plate 3 and 4 are made parallel when the toggle mechanism 9 of the clamp unit 5 is fully extended and the parallelization of the die plates 3 and 4 are stably maintained. Consequently, the stationary die 10A and the movable die 10B are stabilized.

Subsequently, the molten resin is injected from an injection nozzle of the injection unit 1A to the internal cavity 10C of the die 10 so as not to fill the cavity. The injected molten resin is thermoplastic in the same manner as the first embodiment.

After a predetermined time passes from initiating injection of the injection unit 1A or when an injection screw provided in the injection unit 1A reaches a predetermined position, the molding die drive unit 120 is driven. The drive of the molding die drive unit 120 may be conducted after injecting the resin or during injection, and the resin injection amount to the cavity 10C of the die 10 can be voluntarily set.

Since the internal molten resin is not filled in the entire cavity and large force is not required for moving the movable die 10B when the drive of the molding die drive unit 120 is started, driving speed takes precedence over driving force. In other words, the four sub cylinder units 22 are advanced to advance the movable die 10B at a high speed.

Accordingly, the main cylinder flow channel 39 is shut by the main cylinder on-off valve 50 so that the pilot hydraulic pressure is fed to the on-off valve 24 by the main cylinder control valve 51 and the position thereof is switched to block circulation of the hydraulic fluid in the main cylinder flow channel 39. And the position of the sub cylinder switching valve 44 is switched to supply the hydraulic fluid to the sub cylinder unit 22 to advance the sub cylinder unit 22.

Then, as shown in FIG. 12(A), the hydraulic fluid is fed from the hydraulic pump 36 to the sub cylinder unit 22, so that the attachment plate 30 having the movable die 10B attached thereon is advanced at a high speed by the sub cylinder unit 22. Though an advancing force is generated to the piston member 26 of the main cylinder unit 21 in accordance with the advancement of the attachment plate 30, since the on-off valve 24 is open and the hydraulic fluid contained in the reserve tank 23 flows into the main cylinder unit 21 through the conduit line 27E, the piston member 26 is advanced smoothly.

When the movable die 10B advances at a degree, the molten resin loaded in the cavity 10C of the die 10 is pressurized. For the purpose, the main cylinder on-off valve 50 is opened to open the main cylinder flow channel 39 and switch the position thereof to a position allowing the circulation of the hydraulic fluid in the main cylinder flow channel 39 without feeding the pilot hydraulic pressure to the on-off valve 24 by the main cylinder control valve 51.

Then, as shown in FIG. 12(B), the on-off valve 24 is closed to shut the circulation of the hydraulic fluid between the reserve tank 23 and the main cylinder unit 21. Further, the hydraulic fluid is also supplied to the main cylinder unit 21 as well as the sub cylinder unit 22, so that large force by the cylinder units 21 and 22 works on the movable die 10B to fill the entirety of the cavity 10C, from a condition shown in FIG. 13 being concentrated to a central portion of the cavity, with molten resin loaded to the cavity 10C between the movable die 10B and the stationary die 10A as shown in FIG. 14.

While applying pressure to the molten resin by the molding die drive unit 120, cooling and solidification of the molten resin is conducted for a predetermined time period. When the molten resin is sufficiently solidifies after the predetermined time, the clamp unit 5 is driven to retract the movable die plate 4 to open the die 10. Subsequently, the molding product is ejected from the inside of the die 10 to complete the molding process. Thereafter, the injection compression molding process is repeated as necessary.

The cylinder units 21 and 22 are retracted during a time period from initiation of retracting the movable die plate 4 to initiation of next injection molding process.

For the purpose, the main cylinder flow channel 39 is shut by the main cylinder on-off valve 50 to switch the position thereof to feed the pilot hydraulic pressure to the on-off valve 24 and to block the circulation of the hydraulic fluid in the main cylinder flow channel 39, and the position of the sub cylinder switching valve 44 is switched to supply the hydraulic fluid to the sub cylinder unit 22 to retract the sub cylinder unit 22.

Then, as shown in FIG. 12(C), the hydraulic fluid is fed from the hydraulic pump 36 to the sub cylinder unit 22 to retract the attachment plate 30 having the movable die 10B attached thereon at a high speed by the sub cylinder unit 22. In accordance with the retraction of the attachment plate 30, a force for retracting the piston member 26 of the main cylinder unit 212 is caused. However, since the on-off valve 24 is opened and the hydraulic fluid contained in the main cylinder unit 21 is returned into the reserve tank 23 through the conduit line 27E, the piston member 26 is retracted smoothly.

According to the above-described second embodiment, following effect can be obtained as well as the effects 1) to 8) of the first embodiment.

9) In the second embodiment, since the reserve tank 23 is in communication with the main cylinder unit 21 via the on-off valve 24, the exclusive reserve tank 23 is used for supplying the hydraulic fluid to the main cylinder unit 21 and returning the hydraulic fluid from the main cylinder unit 21 when the main cylinder unit 21 is advanced and retracted in accordance with the advancement and the retraction of the sub cylinder unit 22. Accordingly, installation of the reserve tank 23 to the molding die drive unit 20 enables smooth circulation of the hydraulic fluid between the reserve tank 23 and the main cylinder unit 21 in high-speed advancement and retraction of the movable die 10B to improve responsivity of the die movement and, in addition thereto, the size of the outside hydraulic tank and the hydraulic pump can be reduced.

Next, third embodiment of the present invention will be described with reference to FIGS. 15 and 16. In the third embodiment, a part of the movable die 10B is advanced and retracted by the die driving unit 20 and other arrangement of the third embodiment is the same as the second embodiment. In the description of the third embodiment, the same reference numerals will be attached to the component identical with or similar to the first and the second embodiments to omit or simplify the description therefor.

Figures 15, 16:
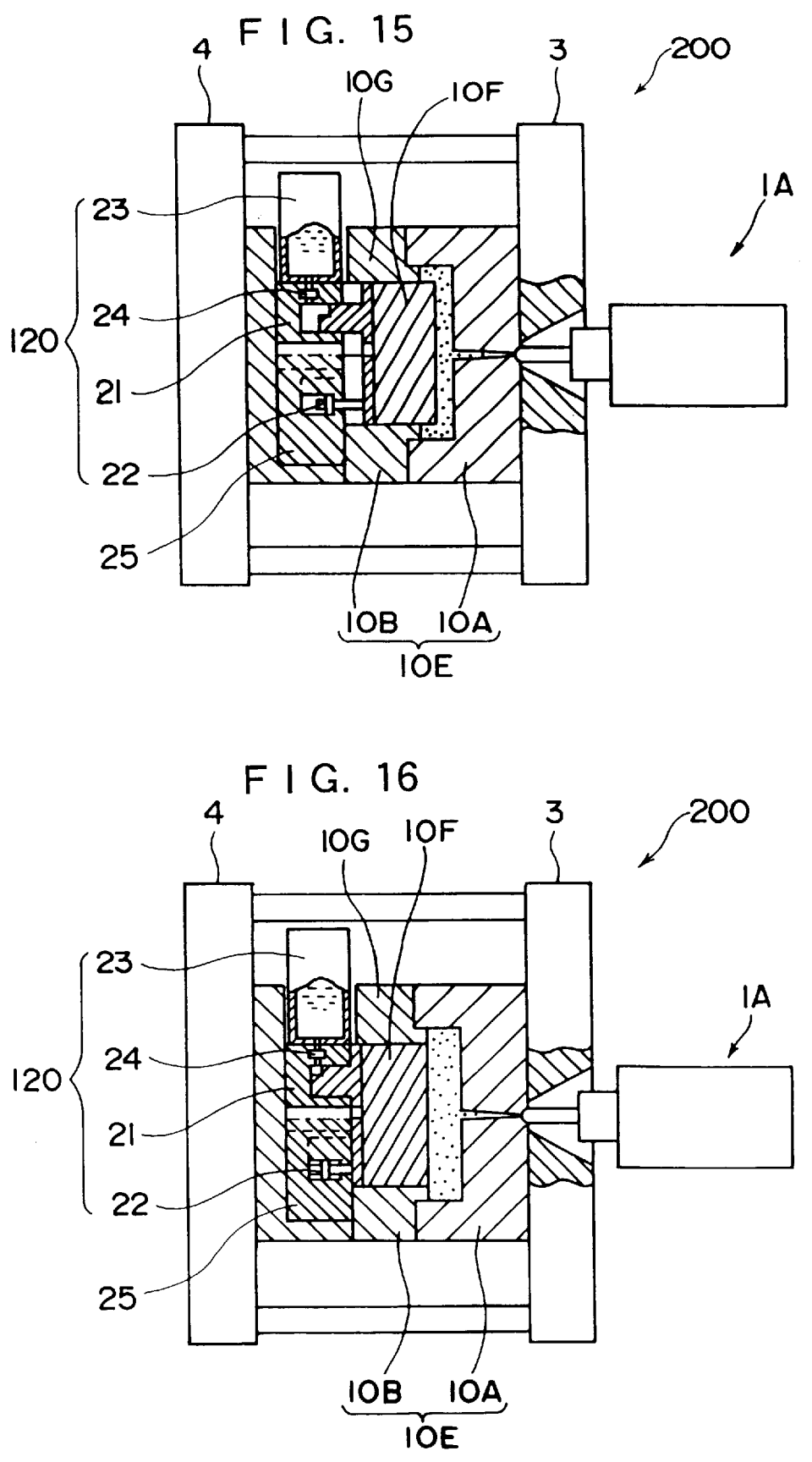

FIG. 15 and FIG. 16 are cross sections respectively showing primary portion of an injection molding unit 200 having the molding die drive unit 120 installed therein. The basic arrangement of the injection molding unit 200 of the third embodiment such as the clamp unit 5, the hydraulic cylinder unit 6 and toggle mechanism 9 is the same as the injection molding unit 1 and 100 of the first and the second embodiment.

In FIG. 15, the movable die 10B has a die body 10G fixed to the cylinder member 25 of the molding die drive unit 120 and having an opening at a central portion thereof, and a slide die 10F disposed at the opening of the die body 10G and being slidable relative to the cavity 10C.

The slide die 10F is fixed to the attachment plate 30 of the molding die drive unit 120.

The molding die drive unit 120 includes a large-diameter main cylinder unit 21, a small-diameter sub cylinder unit 22 disposed around the main cylinder unit 21, a reserve tank 23 in communication with the main cylinder unit 21, an on-off valve 24 for allowing and blocking the circulation of the hydraulic fluid between the reserve tank 23 and the main cylinder unit 21, a hydraulic unit 11 for driving the cylinder unit 21 and 22 (see FIG. 8), and a controller 12 for controlling the molding die drive unit 20 (see FIG. 8).

In the third embodiment, expansible molten resin such as a resin including foaming agent and a resin including glass fiber can be injected into the cavity 10C of the die 10E as well as a normal molten resin.

When the molten resin having expansibility is used, as shown in FIG. 15, the molten resin is injected inside the die 10E while the slide die 10F advances to the stationary die 10A to fill the cavity in the die 10E with the molten resin. Subsequently, as shown in FIG. 16, the slide die 10F is retracted from the stationary die 10A to enlarge the cavity 10C to promote foaming of the foaming agent, thereby producing light-weight molding product by the expansion.

In the third embodiment, effects similar to 2) to 9) of the second embodiment can be obtained and, in addition thereto, 10) effect being capable of partially applying compressive force to the molten resin injected into the die 10E and enlarging cavity 10C can be obtained.

Next, the effect of the present invention will be described below based on specific examples.

EXAMPLE 1

The present example was an experiment in which the injection molding unit 1, the molding die drive unit 20 and the molding process according to the first embodiment was used.

Incidentally, the die used in the Example 1 was for forming a rectangular-plate molding product and had a side gate at a center of a short edge of the cavity. Respective dimensions of the molding products were 1000 mm (vertical)*500 mm (horizontal)*2 mm (thick).

A general-purpose horizontal injection molding unit having clamping force of 850t was used as the injection molding unit. The effective cross section A of the main cylinder unit 21 was 3060 cm$^2$, advancement-side effective cross section B of the sub cylinder unit 22 was 180 cm$^2$, retraction-side effective cross section C of the sub cylinder unit 22 was 230 cm$^2$, and the number n of the sub cylinder unit 22 was four.

EXAMPLE 2

The present example was an experiment in which the injection molding unit 100, molding die drive unit 120 and the molding process according to the second embodiment were used to produce molding product.

Incidentally, the die used in the present embodiment was for forming a rectangular-plate molding product and had a side gate at a center of a short edge of the cavity. Respective dimensions of the molding products were 1000 mm (vertical)*500 mm (horizontal;)*2 mm (thick).

The general-purpose horizontal injection molding unit having clamping force of 850t was used as the injection molding unit as in the Example 1. The effective cross section A of the main cylinder unit 21, the advancement-side effective cross section B of the sub cylinder unit 22, the retraction-side effective cross section C and the number n of the sub cylinder unit 22 ware the same as the Example 1.

COMPARISON 1

Comparison 1 was an experiment to obtain the same molding product by the same die and the same process as the above-described Example 1 using a conventional multi-cylinder clamping type injection compression molding machine.

The multi-cylinder type injection compression molding machine of the comparison 1 had a hydraulic cylinder unit integrally provided on four corners of a stationary die-plate. The piston of the hydraulic cylinder unit was connected to an end of a tie-bar. The piston was driven by hydraulic force to attract the movable die-plate to apply compressive force to the molten resin injected into the die.

COMPARISON 2

Figure 19:
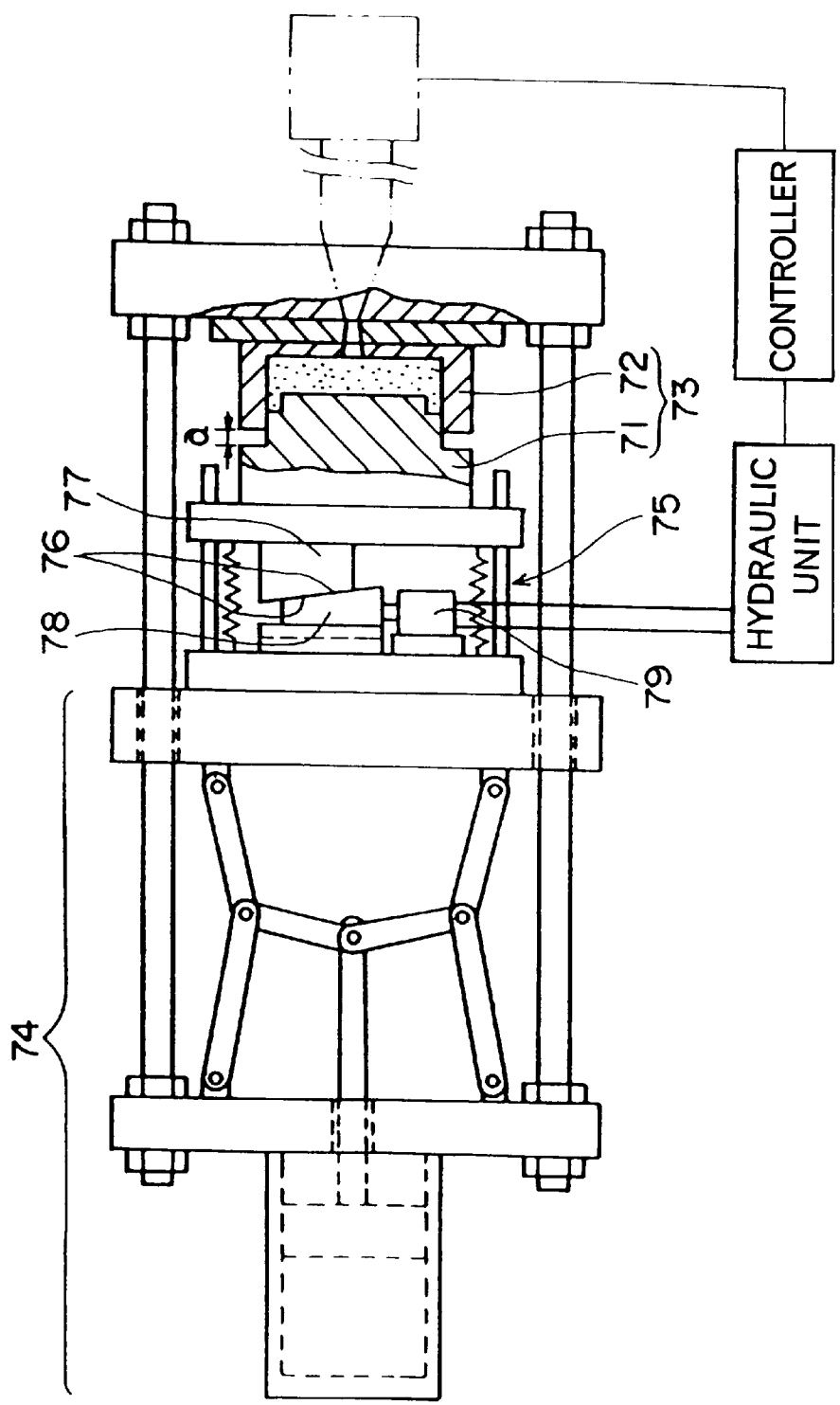
FIG. 19 is a view similar to FIG. 1 showing a conventional example.

The comparison 2 was an experiment to obtain the same molding product by the same die and the same process as the above-described Example 1 using the injection molding unit and the compression unit 75 shown in FIG. 19.

COMMON MOLDING CONDITION

Following common material and molding condition were employed in the above-described Examples 1 and 2 and the Comparisons 1 and 2.

(1) Material: polypropylene (MI=24 g/10 min; 230° C., 2.16 kgf, manufactured by Idemitsu Petrochemical Co., Ltd. Tradename: IDEMITSU PP J-950HP)

(2) Molding Condition

① Molding temperature: 220° C. (injection cylinder temperature)
② Die temperature: 40° C.
③ Resin Injection Time: 3.0 seconds
④ Resin Injection Pressure: 90 kg/cm² (gauge hydraulic pressure)
⑤ Cooling Time: 30 seconds
⑥ Compression Margin: 5 mm (dimension a in FIG. 1)
⑦ Compression Initiation Timing: after 2.8 second (from injection initiation)
⑧ Compression Speed: 10 mm/sec
⑨ Compression Force S: 400t (maintained to be constant until completion of cooling)

EXPERIMENT RESULT

Though unbalanced load relative to the die center was generated in the Example 1 on account of the side gate, the die closed in parallel because of being compressed by the large-diameter hydraulic cylinder unit, thereby obtaining molding products having uniform thickness and no warp. Discharge pressure P of oil of the hydraulic unit was 125 kg/cm² and discharge flow rate Q was 43 l/min.

The mechanical efficiently can be obtained by an equation of $S/\{(A+B*n)*P*0.001\}$, specifically, $400/\{(3060+180*4)*125*0.001\}=400/472.5=0.85=85\%$.

In Example 2, though the die had only one side gate as in the Example 1 and the load was unbalancedly applied to a position off the die center, the die could be closed in parallel since the movable die was driven by the large-diameter hydraulic cylinder unit.

Accordingly, a molding product having less warp and deformation and approximately uniform thickness could be obtained.

The discharge pressure P of the oil of the hydraulic unit was 120 kg/cm² and discharge flow rate was 43 l/min.

The mechanical efficiency was obtained by an equation of $S/\{(A+B*n)*P*0.001\}$, which specifically was 88%.

In comparison 1, since the die had only one side gate and the load was unbalancedly applied to a position off the die center in advancing the movable die, parallel accuracy of the movable die relative to the stationary die cannot be maintained thereby causing deviation of compressive force applied to the molten resin in the die.

Accordingly, the thickness of the molding was 2.2 mm on the side gate and 1.9 mm at the flow end on the other side, thereby not obtaining molding product having uniform thickness.

In comparison 2, the parallel accuracy of the movable die relative to the stationary die could be maintained as in the above Examples and no deviation was caused to the compression force applied to the molten resin in the die, so that a molding product having less warp and deformation with approximately uniform thickness could be obtained. However, the discharge pressure P of the oil of the hydraulic unit was 165 kg/cm² (mechanical efficiency 60%) and discharge flow rate of 200 l/min was required.

Though preferred embodiments and examples of the present invention has been described in the above, the scope of the present invention is not limited to the embodiments and examples but includes various improvement and modification of design is possible as long as they do not depart from the gist of the present invention.

For instance, the entire movable die 10B of the first and the second embodiment and a part of the movable die 10B of the third embodiment are advanced and retracted relative to the cavity 10C. However, entire or a part of the stationary die 10A may be advanced and retracted relative to the cavity 10C in the present invention.

Specifically, a part of the stationary die 10A may be advanced and retracted by the die driving unit 20 as respectively shown in FIGS. 17 and 18.

FIG. 17 is a cross section showing a primary portion of an injection molding unit 300 having the molding die drive unit 120 installed therein. The injection molding unit 300 shown in FIG. 17 has a basic structure such as the clamp unit 5, the hydraulic cylinder unit 6 and the toggle mechanism 9 identical with the injection molding unit 1 and 100 of the first and second embodiment.

In FIG. 17, the stationary die 10A has a die body 10H attached to the cylinder unit 25 of the molding die drive unit and having an opening at a central portion thereof, and a slide die 10J disposed at the opening of the die body 10H slidably toward the cavity 10C. The slide die 10J is fixed to the attachment plate 30.

Figure 17A:
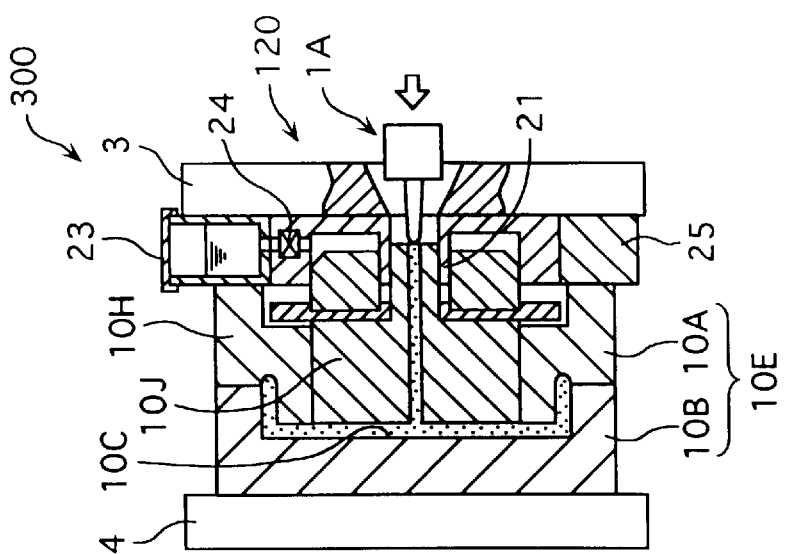
FIG. 17(A) to FIG. 17(C) are cross sections showing primary portion of injection molding unit according to modification of the present invention.
Figure 17B:
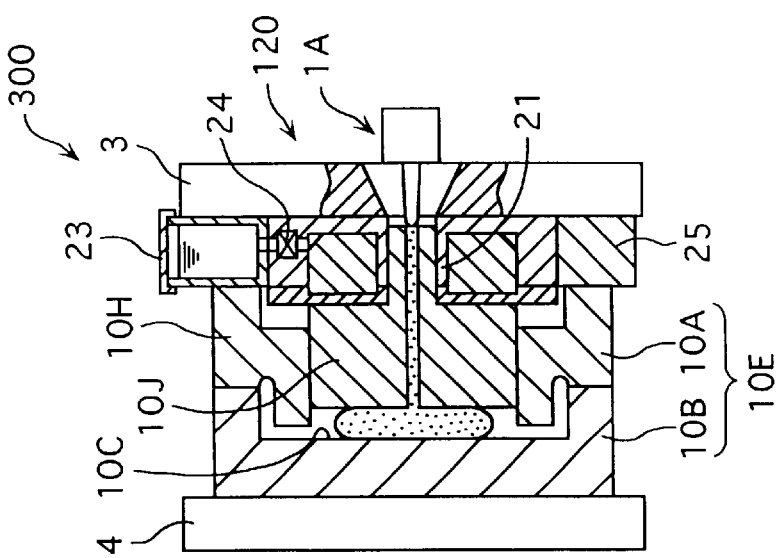
Figure 17C:
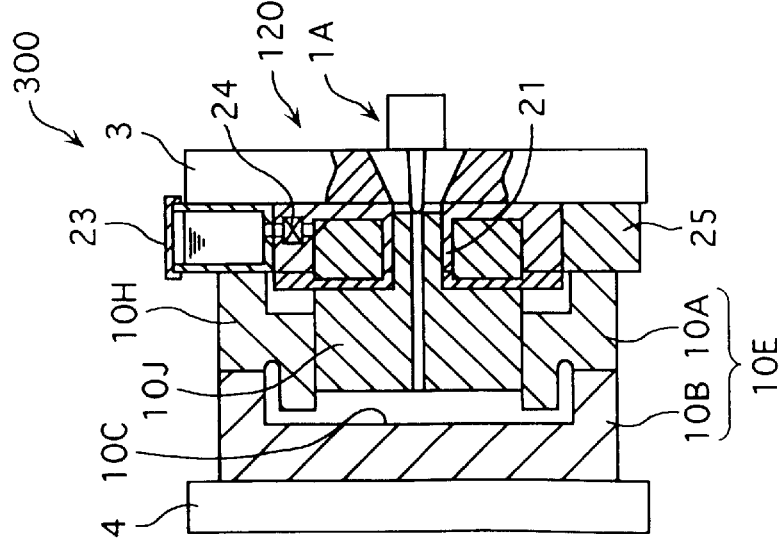

The operation process of the injection molding unit 300 is shown in FIGS. 17(A) to (C). When the slide die 10J of the stationary die 10A is at a retracted position relative to the cavity 10C as in FIG. 17(A), the molten resin is injected into the cavity 10C by the injection unit 1A as shown in FIG. 17(B). Subsequently, the slide die 10J is advanced to the cavity 10C by driving the molding die drive unit 120. At this time, the injection unit 1A advances so that a nozzle portion thereof follows the slide die 10J.

FIG. 18 is a cross section showing primary portion of the injection molding unit 400 having the molding die drive unit 120 installed therein. The injection molding unit 400 shown in FIG. 18 has the same basic structure as the injection molding unit 300 shown in FIG. 18 and the operation step thereof is different.

The operation process of the injection molding unit 400 is shown in FIGS. 18(A) to (C). In FIG. 18(A), the molten resin is injected into the cavity 10C by the injection unit 1A when the slide die 10J of the stationary die 10A is advanced to the cavity 10C being spaced apart at a predetermined gap. At this time, molten resin having expansibility such as resin added with foaming agent and resin including glass fiber is injected into the cavity 10C.

Subsequently, as shown in FIG. 18(B), the nozzle portion of the injection unit 1A is retracted from the die 10E and the slide die 10J is retracted from the cavity 10C by driving the molding die drive unit 120 as shown in FIG. 18(C).

Incidentally, the sub cylinder unit 22 is not shown in FIG. 17 and FIG. 18.

Further, the molten resin may be loaded into the cavity 10C while advancing the movable die 10B and the movable die 10B may be retracted by the molding die driving device 20 to conduct injection expansion molding thereafter.

On the other hand, the molten resin may be loaded into the cavity 10C while retracting the slide die 1OF and the slide die 10F may be advanced thereafter to conduct the injection compression molding.

Specifically, any one of following (1) to (5) may be adopted for the molding method of the present invention:

(1) Injection compression molding method.

(2) Injecting the molten resin to a die having surface member disposed thereinside beforehand to obtain the laminated molding.

(3) Adding foaming agent to the molten resin to be injected and loaded for obtaining foamed molding product.

(4) Injecting molten resin having expansibility by entanglement of fiber mixed therein and enlarging the cavity to expand the molten resin in the die to obtain light-weight molding product.

(5) Injecting gas into the molten resin loaded in the cavity and enlarging the cavity to obtain molding product having large-volume hollow portion.

In other words, any molding method can be used as long as at least a portion of the movable die and the stationary die are relatively moved to freely contract and extend the die interval during molding process in molding the molten resin.

Accordingly, the present invention can be applied to any molding method having a step of injecting while narrowing and enlarging the gap, applying compressive force to the molten resin, and enlarging and contracting the gap after initiating the injection.

Further, though the hydraulic fluid contained in the hydraulic tank 11A structuring the hydraulic unit 11 is fed to the main cylinder unit 21 in the first embodiment, a separate tank containing hydraulic fluid may be independently provided as well as the hydraulic tank 11A and the hydraulic fluid contained in the tank may be fed to the main cylinder unit 21.

INDUSTRIAL APPLICABILITY

As described above, the molding die drive unit, the molding unit having the molding die drive unit installed therein and the molding method using the molding unit according to the present invention is useful for injection molding, injection compression molding, press molding, large blow gas-injection molding, multi-layered molding, foam molding and expansion molding of glass-fiber containing resin. Especially, the present invention is suitable for molding in which at least a portion of the die is advanced and retracted to change the cavity volume provided in the die for compressing or expanding (enlarging volume) the resin in the die.

What is claimed is:

1. An injection molding method using a molding die drive unit to compress or expand volume of a mold closed by a stationary die and a movable die adjacent a movable platen, comprising the steps of:
  applying a force to move the movable platen, the movable platen forcing the movable die to move toward the stationary die and close the mold;
  injecting molten resin into the closed mold via an opening;
  during or after injection of the molten resin, applying a force with a main cylinder unit and a plurality of sub-cylinder units to move at least a portion of one of the movable die or stationary die without movement of the movable platen;
  after forming of a molded product, applying a retracting force only with the plurality of sub-cylinder units to retract the at least a portion of one of the movable die or stationary die without opening the closed mold;
  applying a force to move the movable platen away from the stationary die to open the mold; and
  removing the molded product from the mold.

2. A molding die drive unit for changing the dimensions of a closed cavity formed by a stationary die and a movable die for receiving molten resin, the molding die drive unit being detachably attached to either the stationary die or the movable die for moving a part of or entirety of at least one of the stationary die and the movable die to be advanced and retracted relative to the closed cavity, the molding die drive unit comprising:
  a large-diameter main cylinder unit having an opening formed along a center axis; and
  a plurality of small-diameter sub cylinder units disposed around the main cylinder unit and spaced apart with respect to each other.

3. The molding die drive unit according to claim 2, wherein the main cylinder unit is connected to a main cylinder driving mechanism, the main cylinder driving mechanism comprising: a main cylinder flow channel disposed between a hydraulic fluid feeder for feeding hydraulic fluid from a hydraulic tank and the main cylinder unit; and a main cylinder switching valve provided in the main cylinder flow channel for switching position thereof between a position for supplying the hydraulic fluid to the main cylinder unit to advance the main cylinder unit and a position for blocking supply of the hydraulic fluid to the main cylinder unit and for returning the hydraulic fluid in the main cylinder unit to the hydraulic tank.

4. The molding die drive unit according to claim 2, further comprising a reserve tank disposed adjacent to the main cylinder unit and an on-off valve provided between the main cylinder unit and the reserve tank for allowing or blocking circulation of the hydraulic fluid between the main cylinder unit and the reserve tank.

5. The molding die drive unit according to claim 3, wherein the sub cylinder units are connected to a sub cylinder driving mechanism, the sub cylinder driving mechanism comprising: a sub cylinder flow channel provided between the hydraulic fluid feeder and the sub cylinder units; a sub cylinder switching valve provided in the sub cylinder flow channel for switching a position of the valve to one of a position for supplying the hydraulic fluid to the sub cylinder units to advance the sub cylinder units, a position for supplying the hydraulic fluid to the sub cylinder units to retract the sub cylinder units and a position for blocking intercommunication of the hydraulic fluid between the sub cylinder units and the hydraulic fluid feeder.

6. A molding unit having the molding die drive unit according to claim 2 between a movable platen having the movable die thereon and a stationary platen having the stationary die thereon.

7. A molding unit according to claim 6 wherein a pressure-receiving block is provided between the movable platen and the stationary platen.

8. A molding method for molding resin using the molding unit according to claim 6, comprising the steps of:
  injecting a molten resin into the closed cavity; and
  advancing and retracting a part or an entirety of at least one of the stationary die and the movable die relative to the closed cavity at any time period after initiation of injection.

9. The molding method according to claim 8, wherein the sub cylinder units are driven to advance the part or the entirety of at least one of the stationary die or the movable die at a high speed relative to the cavity while intercommunicating the main cylinder unit with the hydraulic tank or the reserve tank; and wherein hydraulic pressure is applied to both the main cylinder unit and the sub cylinder unit while blocking intercommunication of the main cylinder unit with the hydraulic tank or the reserve tank to pressurize the molten resin loaded in the closed cavity and to advance the part or the entirety of at least one of the stationary die or the movable die relative to the closed cavity.

10. A molding die drive unit for compressing and expanding volume of a mold in a mold device formed by a stationary die and a movable die, the mold device including an advancement device for applying a force to move a movable platen, said movable platen moving said movable die to close the mold, said molding die drive unit being positioned between said movable platen and said movable die, or between said stationary die and a stationary platen, said molding die drive unit comprising:

a main cylinder unit having a main piston member for applying a force to move at least a part of one of said movable die and said stationary die, and a plurality of sub-cylinder units disposed about said main cylinder unit and having sub-piston members for applying a force to move at least a part of one of said movable die and said stationary die, wherein said main cylinder unit and said plurality of sub-cylinder units apply force to at least a part of one of said movable die and said stationary die, separately from said advancement device.

11. The molding die drive unit according to claim 10, wherein said main cylinder unit and said plurality of sub-cylinder units move at least a part of one of said movable die and said stationary die while maintaining said mold device in a closed position.

12. The molding die drive unit according to claim 10, wherein said main cylinder unit includes: a main cylinder driving mechanism;

a main cylinder flow channel disposed between a hydraulic fluid feeder for feeding hydraulic fluid between a hydraulic tank and said main cylinder driving mechanism; and a main cylinder switching valve disposed in said main cylinder flow channel for switching between a position providing hydraulic fluid to said main cylinder driving mechanism to advance said main piston member, a position for blocking supply of the hydraulic fluid to said main cylinder mechanism, and a position for returning the hydraulic fluid in said main cylinder mechanism to said hydraulic tank while retracting said main piston member.

13. The molding die drive unit according to claim 10, wherein said main cylinder drive unit includes a reserve tank disposed adjacent to said main cylinder mechanism and an on-off valve provided between said main cylinder mechanism and said reserve tank for allowing or blocking circulation of the hydraulic fluid between said main cylinder mechanism and said reserve tank.

14. The molding die drive unit according to claim 10, wherein said sub-cylinder units comprise:

a plurality of sub-cylinder driving mechanisms corresponding to said sub-cylinder units, each sub-cylinder driving mechanism including one of said sub-piston members; a sub-cylinder flow channel arrangement disposed between said hydraulic fluid feeder and said sub-cylinder mechanisms for feeding hydraulic fluid between a hydraulic tank and said sub-cylinder driving mechanisms;

a single sub-cylinder switching valve disposed in said sub-cylinder flow channel arrangement for switching between a position providing hydraulic fluid to said sub-cylinder mechanisms to advance said sub-piston members, a position for blocking supply of the hydraulic fluid to said sub-cylinder mechanisms, and a position for returning the hydraulic fluid in said sub-cylinder mechanisms to said hydraulic tank while retracting said sub-piston members.

15. The molding die drive unit according to claim 12, wherein said sub-cylinder units retract at least a part of one of said movable die and said stationary die without assistance from said main cylinder unit.

16. The molding die drive unit according to claim 12, wherein said sub-cylinder units retract at least a part of one of said movable die and said stationary die during or after injection of a molten resin for a molding process requiring foaming of a foaming agent.

17. The molding die drive unit according to claim 10, wherein said main cylinder unit and said plurality of sub-cylinder units apply a force to move at least a part of said movable die.

18. The molding die drive unit according to claim 10, wherein said main cylinder unit and said plurality of sub-cylinder units apply a force to move a part of said stationary die.

19. The molding die drive unit according to claim 10, including an injection opening for injecting molten resin into the mold.

* * * * *